(12) United States Patent
Zhang et al.

(10) Patent No.: US 12,113,590 B2
(45) Date of Patent: Oct. 8, 2024

(54) BEAM MANAGEMENT METHOD, APPARATUS, ELECTRONIC DEVICE AND COMPUTER READABLE STORAGE MEDIUM

(71) Applicant: SAMSUNG ELECTRONICS CO., LTD., Suwon-si (KR)

(72) Inventors: Yiyan Zhang, Beijing (CN); He Wang, Beijing (CN); Songhui Shen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 431 days.

(21) Appl. No.: 16/874,971

(22) Filed: May 15, 2020

(65) Prior Publication Data

US 2020/0366340 A1 Nov. 19, 2020

(30) Foreign Application Priority Data

May 16, 2019 (CN) .......................... 201910407862.9

(51) Int. Cl.
*H04B 7/0408* (2017.01)
*G06N 3/08* (2023.01)
(Continued)

(52) U.S. Cl.
CPC ............. *H04B 7/0408* (2013.01); *G06N 3/08* (2013.01); *G06N 20/00* (2019.01); *H04B 7/0617* (2013.01);
(Continued)

(58) Field of Classification Search
None
See application file for complete search history.

(56) References Cited

U.S. PATENT DOCUMENTS 10,069,555 B2   9/2018 Islam et al.
10,439,703 B2  10/2019 Nilsson et al.
(Continued)

FOREIGN PATENT DOCUMENTS

CN   103765794 A   4/2014
CN   104955061 A   9/2015
(Continued)

OTHER PUBLICATIONS

Intel, "On Beam Correspondence Optionality", RP-182495, 3GPP TSG-RAN Plenary meeting #82, Sorrento, IT, Dec. 10-13, 2018, slides 1-8, 11 pages total.
(Continued)

*Primary Examiner* — Chirag G Shah
*Assistant Examiner* — Suk Jin Kang
(74) *Attorney, Agent, or Firm* — Sughrue Mion, PLLC

(57) ABSTRACT

A beam management method is provided. The beam management method is performed by a user equipment and includes receiving, by the at least one processor, reference signals corresponding to a transmitting beam by using a first receiving beam and a second receiving beam; identifying, by the at least one processor, a first reference signal receiving power (RSRP) of the first receiving beam and a second RSRP of the second receiving beam; analyzing, by the at least one processor, the first RSRP and the second RSRP respectively by a machine learning model; and identifying, by the at least one processor, a beam management operation corresponding to the transmitting beam according to a result of the analyzing.

20 Claims, 13 Drawing Sheets

(51) Int. Cl.
  *G06N 20/00* (2019.01)
  *H04B 7/06* (2006.01)
  *H04B 17/318* (2015.01)
  *H04L 5/00* (2006.01)

(52) U.S. Cl.
  CPC ......... *H04B 7/0684* (2013.01); *H04B 17/318* (2015.01); *H04L 5/0051* (2013.01)

(56) References Cited

U.S. PATENT DOCUMENTS

| | | | |
|---|---|---|---|
| 10,666,342 B1* | 5/2020 | Landis | H04B 17/373 |
| 2013/0059619 A1 | 3/2013 | Kim et al. | |
| 2015/0237510 A1* | 8/2015 | Kludt | H04W 16/28 370/328 |
| 2016/0043781 A1* | 2/2016 | Cho | H01Q 3/24 342/368 |
| 2016/0337020 A1 | 11/2016 | Cherubini et al. | |
| 2017/0311353 A1 | 10/2017 | Liu et al. | |
| 2018/0049042 A1* | 2/2018 | Yu | H04B 7/0695 |
| 2018/0063692 A1* | 3/2018 | Ramachandra | H04W 48/16 |
| 2018/0206132 A1 | 7/2018 | Guo et al. | |
| 2018/0262918 A1 | 9/2018 | Zhao et al. | |
| 2018/0323845 A1 | 11/2018 | Chang et al. | |
| 2018/0351629 A1* | 12/2018 | Nilsson | H04B 7/088 |
| 2019/0044593 A1* | 2/2019 | John Wilson et al. | H04B 7/088 |
| 2019/0052341 A1* | 2/2019 | Furuskog | H04W 16/28 |
| 2019/0068262 A1* | 2/2019 | Yu | H04W 72/046 |
| 2019/0068264 A1 | 2/2019 | Agrawal et al. | |
| 2019/0068265 A1 | 2/2019 | Lee et al. | |
| 2019/0191425 A1* | 6/2019 | Zhu | G06N 3/08 |
| 2019/0305830 A1* | 10/2019 | Zhou | H04W 74/0833 |
| 2019/0335477 A1* | 10/2019 | Nam | H04L 5/0048 |
| 2020/0007221 A1* | 1/2020 | Nilsson | H04L 25/0204 |
| 2020/0014448 A1* | 1/2020 | Osawa | H04B 7/0641 |
| 2020/0091988 A1* | 3/2020 | Zhang | H04B 7/0695 |
| 2020/0186227 A1* | 6/2020 | Reider | H04L 41/16 |
| 2020/0195335 A1* | 6/2020 | Xia | H04B 7/088 |
| 2020/0204237 A1* | 6/2020 | Zhou | H04W 24/10 |
| 2020/0244338 A1* | 7/2020 | Raghavan | H04L 5/0057 |
| 2020/0259545 A1* | 8/2020 | Bai | H04B 7/0632 |
| 2020/0260432 A1* | 8/2020 | Islam | H04W 72/0413 |
| 2020/0274666 A1* | 8/2020 | Zhang | H04B 7/086 |
| 2020/0358514 A1* | 11/2020 | Landis | G06N 3/088 |
| 2020/0358515 A1* | 11/2020 | Li | H04B 7/0695 |
| 2020/0367223 A1* | 11/2020 | Cheng | H04W 72/046 |
| 2020/0413316 A1* | 12/2020 | Isaksson | H04W 24/10 |
| 2021/0013933 A1* | 1/2021 | Zhou | H04B 17/309 |
| 2021/0091834 A1* | 3/2021 | Wu | H04L 5/0048 |
| 2021/0242924 A1* | 8/2021 | Nilsson | H04B 7/0695 |
| 2021/0258063 A1* | 8/2021 | Ottersten | H04W 24/04 |
| 2021/0288710 A1* | 9/2021 | Nilsson | H04L 25/0204 |
| 2021/0297128 A1* | 9/2021 | Badic | H04B 7/088 |
| 2021/0344407 A1* | 11/2021 | Huang | H04B 7/088 |
| 2021/0376902 A1* | 12/2021 | Burstrom | H04B 7/0695 |
| 2022/0045734 A1* | 2/2022 | Liu | H04L 5/0025 |
| 2022/0060240 A1* | 2/2022 | Xia | H04B 7/0695 |
| 2022/0060302 A1* | 2/2022 | Zhang | H04W 24/10 |

FOREIGN PATENT DOCUMENTS

| | | |
|---|---|---|
| CN | 106160833 A | 11/2016 |
| CN | 106374984 A | 2/2017 |
| CN | 108574954 A | 9/2018 |
| CN | 109076533 A | 12/2018 |
| CN | 109379752 A | 2/2019 |
| CN | 109428642 A | 3/2019 |
| WO | 2016/197958 A1 | 12/2016 |
| WO | 2018/135986 A1 | 7/2018 |
| WO | 2019029802 A1 | 2/2019 |
| WO | 2019/062552 A1 | 4/2019 |

OTHER PUBLICATIONS

Ajay Shrestha et al., "Review of Deep Learning Algorithms and Architectures", IEEE Access, vol. 7, DOI: 10.1109/ACCESS.2019 2912200, Apr. 22, 2019 pp. 53040-53065, 28 pages total.

International Search Report dated Aug. 14, 2020 issued by the International Searching Authority in counterpart International Application No. PCT/KR2020/006323 (PCT/ISA/210).

Communication dated Mar. 17, 2022 issued by the European Patent Office in European Patent Application No. 20804923.9.

Jian-Jiang Zhou et al., "Broadband beamforming algorithm based on generalized regression neural network integration", Journal of Astronautics, Issue 8, 2012, pp. 1127-1131 (12 total pages), url: http://www.zghtqk.com/SKY/journals/original.html?id=10136.

Miguel R. Castellanos et al., "Channel Reconstruction-Based Hybrid Precoding for Millimeter Wave Multi-User MIMO Systems", IEEE Journal of Selected Topics in Signal Processing, vol. 12, Issue: 2, 2018, pp. 383-398 (32 total pages), arXiv:1802.05146v1.

AT&T, "V2X sidelink PHY structure and procedures", R1-1810698, 3GPP TSG RAN WG1 Meeting #94bis, Chengdu, China, Oct. 2018, 9 pages.

Communication issued by the China National Intellectual Property Administration on Apr. 26, 2023 for Chinese Application No. 201910407862.9.

Ericsson, "The QCL framework in Nr", R1-1714318, 3GPP TSG-RAN WG1 #90, Prague, Czechia, Aug. 21-25, 2017, 6 pages.

Office Action issued on Sep. 28, 2023 by the Chinese Patent Office in corresponding CN Patent Application No. 201910407862.9.

* cited by examiner

BEAM MANAGEMENT METHOD, APPARATUS, ELECTRONIC DEVICE AND COMPUTER READABLE STORAGE MEDIUM

CROSS-REFERENCE TO RELATED APPLICATION(S)

This application is based on and claims priority under 35 U.S.C. § 119 to Chinese Patent Application Number 201910407862.9, filed on May 16, 2019, in the China National Intellectual Property Administration, the disclosure of which is incorporated by reference herein in its entirety.

BACKGROUND

Field

The disclosure relates to wireless communication technologies, and in particular, to a beam management method, apparatus, electronic device, and computer readable storage medium.

Description of Related Art

In the mobile broadband wireless communication system, in order to improve the communication performance of the system, beamforming signal processing technology is used at both ends of the base station and the mobile station, and the communication performance is improved by spatial multiplexing and interference reduction. In the new generation of cellular mobile communication systems (5G and beyond), the use of millimeter wavebands for communication enables beamforming techniques that greatly increase the power for transmitting and receiving signals to be more widely used. In millimeter wave communication, the propagation path loss of the millimeter wave is significantly higher than that of the low-band carrier.

For the beamforming used in millimeter waves, because the formed beam needs to compensate for high propagation loss, the formed beam has characteristics of a higher directional gain and a narrower beam width. Thus, the angle range which can be used to operate is very small in the three-dimensional space where the millimeter wave beams practically exist, and the necessary power gain cannot be provided once beyond the specified high-power gain range. Therefore, at both ends for receiving signals and transmitting signals, multiple beams are used to cover the entire three-dimensional space as much as possible to ensure that a suitable beam generates a large signal gain at any possible operating angle. The transceiver selects and forms the beam in the most appropriate direction based on the current channel state.

Considering the characteristics of mobile communication, the state, location, and surrounding environment of the user equipment (UE) will constantly change. Thus, the optimal beam used for communication will also change in real time. The UE needs to switch to the appropriate beam in time to maintain a high-quality communication link according to the change of the condition, otherwise the link will be interrupted, and the signal transmission speed may be greatly reduced or even terminated.

Beam management is a solution to a series of problems such as beam mismatch in beamforming and beam reselection. A beam management algorithm can discover or predict that the transmitting/receiving beam pair loses matching, and reselect the optimal beam for the UE in time to maintain a good link communication quality for a long time.

There are three main reasons for the mismatch of the transmitting/receiving beam pair, including the rotation of the UE itself, changes in the location, and changes in the surrounding environment (such as obstruction of obstacles). Therefore, for a typical mobile device, the beam pair mismatch is very likely to occur under normal conditions. At this time, the main problems to be solved in the beam management are: finding the mismatch of the beam pair as early as possible, and reducing the probability of the link interruption by predicting and reselecting the optimal beam in time.

Related device use a simple receiving beam scanning. The method can periodically trigger the receiving beam scanning, that is, sequentially traverse each receiving beam, measure the size of the reference signal receiving power (RSRP) transmitted on the receiving/transmitting beam, and reselect the beam with the highest receiving power from the measured beams according to the size of the measured receiving power as the beam for the current data transmission, and perform the switching of the current active beam.

However, the effect of this method is not ideal. The entire process of each beam scanning lasts a long time, and even if a mismatch of the beam pair is found, the beam is reselected after the beam has been mismatched. Because the scanning time is long, the reselected beam may be not the optimal beam after the measurement, which results in low selection accuracy, poor effect, and is still likely to cause link interruption.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

In accordance with an aspect of the disclosure there is provided a beam management method performed by a user equipment (UE) that includes at least one processor, the beam management method including: receiving, by the at least one processor, reference signals corresponding to a transmitting beam by using a first receiving beam and a second receiving beam; identifying, by the at least one processor, a first reference signal receiving power (RSRP) of the first receiving beam and a second RSRP of the second receiving beam; analyzing, by the at least one processor, the first RSRP and the second RSRP respectively by a machine learning model; and identifying, by the at least one processor, a beam management operation corresponding to the transmitting beam according to a result of the analyzing.

The receiving the reference signals may include: identifying, by the at least one processor, the first receiving beam and the second receiving beam based on current beam pattern and a predefined selection rule; receiving, by the at least one processor, multiple reference signals through the first receiving beam and the second receiving beam; and identifying, by the at least one processor, multiple RSRPs respectively corresponding to the multiple reference signals.

A second range of the second receiving beam may include a first range of the first receiving beam.

A correspondence between the first receiving beam and the second receiving beam may change as an antenna array configuration of the UE changes.

The first receiving beam may include any one or any combination of an active beam and a predefined receiving beam of the UE.

The receiving the reference signals may include: identifying, by the at least one processor, a receiving beam ratio of the first receiving beam to the second receiving beam; identifying, by the at least one processor, a receiving beam order of the first receiving beam and the second receiving beam; receiving, by the at least one processor, a corresponding reference signal according to the receiving beam ratio and the receiving beam order by using the first receiving beam and the second receiving beam sequentially; and identifying, by the at least one processor, the RSRP of the corresponding reference signal.

The receiving the reference signals may include: measuring, by the at least one processor, the reference signal N1 times alternately using the first receiving beam and the second receiving beam, wherein the first receiving beam is the active beam; monitoring, by the at least one processor, a rotation speed of the UE; based on the UE detecting that the rotation speed exceeds a threshold, measuring, by the at least one processor, the reference signal N2 times alternately using the first receiving beam and the second receiving beam, wherein the first receiving beam includes multiple predefined receiving beams; identifying, by the at least one processor, whether a signal of the UE is occluded; and based on the UE detecting that the signal is occluded, measuring, by the at least one processor, the reference signal N3 times alternately using the first receiving beam and a corresponding second receiving beam, wherein a measuring ratio of the first receiving beam and the second receiving beam is a predefined ratio, and the first receiving beam includes the multiple predefined receiving beams and active beams. N1, N2, and N3 are all positive integers.

The result of the analyzing may indicate any one or any combination of: a predicted value of a state of each receiving beam of the UE; an evaluation value of each receiving beam of the UE; a beam ranking corresponding to each receiving beam of the UE; a candidate set of optimal receiving beams; a long-term value when each receiving beam of the UE is an active beam; the beam to be measured; a measuring order; and a beamforming codebook to be used.

The beam management method may further include, before analyzing each RSRP by the machine learning model: arranging, by the at least one processor, multiple RSRPs according to a predefined format, the multiple RSRPs including the first RSRP and the second RSRP; and performing, by the at least one processor, data preprocessing on the multiple RSRPs, respectively.

The performing data preprocessing includes any one or any combination of the following actions that are performed by the at least one processor: increasing an offset; downscaling data of a first predefined ratio; upscaling data of a second predefined ratio; increasing an offset and downscaling data of the first predefined ratio; increasing an offset and upscaling data of the second predefined ratio.

The machine learning model may include a reinforcement-learning-based Q learning model, and a Q function of the reinforcement-learning-based Q learning model may include an artificial neural network model and hidden layers of the reinforcement-learning-based Q learning model may include a bidirectional long short term memory network model.

A training method of the machine learning model includes: obtaining, by the at least one processor, a predefined amount of original data; processing, by the at least one processor, the original data according to a predefined reinforcement learning method to obtain corresponding training data; and training, by the at least one processor, the machine learning model based on the training data to obtain a trained machine learning model.

The beam management method may further include: performing, by the at least one processor, corresponding beam management based on the beam management operation; and refining, by the at least one processor, corresponding parameters of the machine learning model based on processing result of the beam management to further optimize the machine learning model.

The identifying the beam management operation corresponding to the transmitting beam may include any one or any combination of the following operations that are performed by the at least one processor: determining to switch the receiving beam; switching a current receiving beam to an identified receiving beam, the identified receiving beam being identified based on a beam state and/or an evaluation value; maintaining a current beam receiving configuration; determining whether to switch the current beam receiving configuration; determining a subsequent receiving beam for a subsequent measurement period based on the beam state and/or the evaluation value; and determining whether to switch a receiving beam and to change a beamforming codebook.

The UE may be operating in a carrier aggregation state where multiple carrier components are included, wherein the machine learning model may include a corresponding machine learning model for each of the multiple carrier component. The receiving the reference signals may include: for each carrier component, receiving, by the at least one processor, the reference signals corresponding to the transmitting beam by using the first receiving beam and the second receiving beam corresponding to a corresponding carrier component, respectively, and determining, by the at least one processor, a corresponding RSRP of each received beam. The analyzing each RSRP respectively by the machine learning model, may include: analyzing, by the at least one processor, each RSRP respectively by the corresponding machine learning model.

The beam management method may further include: determining, by the at least one processor, a beam pattern corresponding to each of the multiple carrier components based on a codebook of each of the multiple carrier components; and determining, by the at least one processor, at least two receiving beams respectively corresponding to each of the multiple carrier components based on a corresponding beam pattern and a predefined beam selection rule.

The UE may measure multiple reference signals respectively transmitted on multiple transmitting beams. The receiving the reference signals may include: for any of the multiple transmitting beams, receiving, by the at least one processor, the reference signals transmitted by the multiple transmitting beams by using at least two receiving beams, respectively, and identifying, by the at least one processor, an RSRP of each receiving beam. The analyzing of each RSRP respectively by the machine learning model, may include: for any one of the multiple transmitting beams, analyzing, by the at least one processor, each RSRP by a corresponding machine learning model. The identifying the beam management operation corresponding to the multiple transmitting beams, may include: for any of the multiple transmitting beams, determining, by the at least one processor, the beam management operation corresponding to the multiple transmitting beams. The beam management method may include: performing, by the at least one processor, a corresponding beam management according to the multiple transmitting beams based on transmission data being received from any of the multiple transmitting beams.

The beam management method may include: performing, by the at least one processor, the corresponding beam management according to the beam management operation of the switched transmitting beam of the transmission data based on the transmission data being switched.

In accordance with an aspect of the disclosure there is provided a user equipment that includes: a memory storing instructions; and at least one processor configured to operate according to the instructions to implement: a processing module, configured to receive reference signals corresponding to a transmitting beam by using a first receiving beam and a second receiving beam, and determine a first reference signal receiving power (RSRP) of the first receiving beam and a second RSRP of the second receiving beam; an analyzing module, configured to analyze the first RSRP and the second RSRP by a machine learning model; and a determining module, configured to identify a beam management operation corresponding to the transmitting beam based on an output of the analyzing module.

In accordance with an aspect of the disclosure there is provided a wireless communication device that includes: a memory storing instructions; and at least one processor configured to operate according to the instructions to: receive, while operating in a first beam configuration, a first fine reference signal through a first fine receiving beam and a first broad reference signal through a first broad receiving beam; identify a first fine reference signal receiving power (RSRP) corresponding to the first fine reference signal; identify a first broad RSRP corresponding to the first broad reference signal; provide the first fine RSRP and the first broad RSRP to a machine learning model; identify a second beam configuration based on an output of the machine learning model, the second beam configuration indicating a second fine beam and a second broad beam; and switch a current beam configuration of the wireless communication device from the first beam configuration to the second beam configuration.

A first broad range of the first broad receiving beam may include a first fine range of the first fine receiving beam.

A codebook indicating a plurality of broad beams and a plurality of fine beams may be stored in the memory, and the second beam configuration may be identified based on the output of the machine learning model and the codebook.

The wireless communication device may include an accelerometer. The at least one processor may be further configured to operate according to the instructions to: identify a rotation speed of the wireless communication device based on an output of the accelerometer; and identify the second beam configuration based on the output of the machine learning model and the rotation speed of the wireless communication device.

The at least one processor may be further configured to operate according to the instructions to identify the second beam configuration based on whether the rotation speed of the wireless communication device is faster than a threshold speed.

The at least one processor may be further configured to operate according to the instructions to continuously train the machine learning model according to each identified RSRP.

In accordance with an aspect of the disclosure there is provided a non-transitory computer readable recording medium including a program for executing a beam management method, the beam management method including: receiving reference signals corresponding to a transmitting beam by using a first receiving beam and a second receiving beam; identifying a first reference signal receiving power (RSRP) of the first receiving beam and a second RSRP of the second receiving beam; analyzing the first RSRP and the second RSRP respectively by a machine learning model; and identifying a beam management operation corresponding to the transmitting beam according to a result of the analyzing.

The aspects and advantages of the present invention will be set forth in part in the following description, and will become apparent from the following description, or will be understood through the practice of the present application.

BRIEF DESCRIPTION OF THE DRAWINGS

The above and additional aspects, features and advantages of certain embodiments of the present disclosure will be more apparent from the following description taken in conjunction with the accompanying drawings, in which.

DETAILED DESCRIPTION

Figure 1:
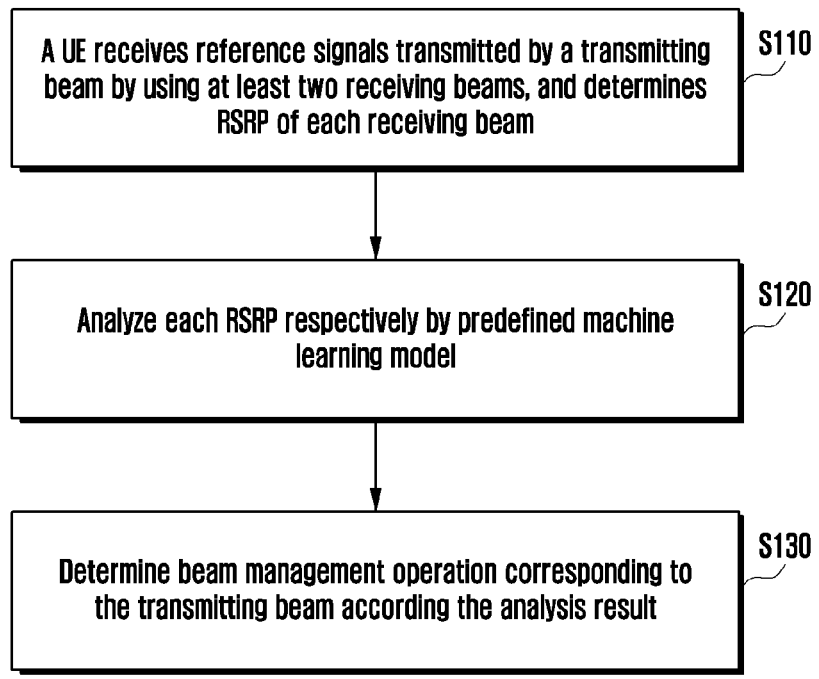
FIG. 1 is a schematic flowchart of a beam processing method according to an embodiment.

Embodiments will be described with reference to the accompanying drawings. Same or similar reference numerals refer to same or similar elements or elements having same or similar functions. The embodiments described with reference to the accompanying drawings are illustrative, are used for explaining the present disclosure and should not be regarded as any limitations thereto.

It should be understood that singular forms "a", "an", "the" and "said" include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can include wireless connection or wireless coupling. By contrast, when an element is referred to as being "directly connected," or "directly coupled," to another element, there are no intervening elements present. As used herein, the term "and/or" includes all or any of one or more associated listed items or combinations thereof. As used herein, the terms "1st" or first" and "2nd" or "second" may use corresponding component regardless of importance or order and are used to distinguish a component from another without limiting the components. The expression, "at least one of a, b, and c," should be understood as including only a, only b, only c, both a and b, both a and c, both b and c, or all of a, b, and c.

In order to make the objects, technical solutions and advantages clearer, the embodiments will be further described in detail below with reference to the accompanying drawings.

One or more embodiments provide an improvement to a problem in the related art in which the time of the process of scanning a beam is very long, depending on the number of beams to be scanned (for example, the number of the UE's beam may be 16, 32, or 64, etc.) and the frequency of the transmitted reference signal, and the UE cannot track the beam state in time.

One or more embodiments provide an improvement to a problem in the related art in which the UE detects the mismatch of the beam too late, and a link interruption may have occurred at this time.

One or more embodiments provide an improvement to a problem in the related art in which even if the reselection of the receiving beam is performed, the reselected beam is the optimal beam at the past time, and is not suitable for the current state, thus the accuracy of the selected beam is low.

One or more embodiments provide an improvement to a problem in the related art in which the method cannot be optimized for different scenarios, and the process of this method is severely affected by the scenario. For the UE in a fast-changing environment, the effect of the beam selection and maintaining a good link quality will be worse.

The following embodiments may be combined with each other, and the same or similar concepts or processes may not be described in some embodiments. Embodiments will be described below with reference to the accompanying drawings.

FIG. 1 is a schematic flowchart of a beam processing method according to an embodiment. As shown in FIG. 1, the method includes: step S110, a UE receives reference signals transmitted by a transmitting beam by using at least two receiving beams, and determines a reference signal receiving power (RSRP) of each receiving beam; step S120: analyze each RSRP respectively by the predefined machine learning model; step S130: determine beam management operation corresponding to the transmitting beam according to the analysis result.

In the beam management method shown in FIG. 1, the UE receives the reference signals transmitted by the transmitting beams by using at least two receiving beams, and determines the RSRP of each receiving beam, analyzes the RSRP by a predefined machine learning module, and determines a beam management operation corresponding to the transmitting beam so as to determine the corresponding beam management operation fast and accurately according to the transmitting beam by the predefined machine learning module, so that the UE can track the current beam state in time, thereby greatly improving the timeliness of the current beam mismatch detection and the accuracy of the beam reselection, and ensuring that the UE can maintain a good link quality by continually tracking and switching to the beam which satisfies the communication needs regardless of the change of the environment and greatly reducing the impact of environment on UE beam selection.

In one embodiment, the UE receives reference signals transmitted by a transmitting beam by using at least two receiving beams, and determines RSRP of each receiving beam. The UE determines to RSRP of the receiving beams by determining at least two receiving beams based on current beam pattern and a predefined selection rule; and receiving multiple reference signals through the at least two receiving beams, and determining multiple corresponding RSRPs. The at least two receiving beams include a first receiving beam, and a second receiving beam covering the range of the first receiving beam.

The first receiving beam includes an active beam and/or a predefined receiving beam of the UE.

A correspondence between the first receiving beam and the second receiving beam changes as an antenna array configuration of the UE changes.

The UE receives reference signals transmitted by a transmitting beam by using at least two receiving beams. The UE receives the at least two receiving beams by: determining receiving beam ratio of the first receiving beams to the second receiving beams and receiving beam order of the first receiving beams and the second receiving beams; receiving the corresponding reference signal according to the receiving beam ratio and the receiving beam order by using the determined at least one first receiving beam and the determined second receiving beam sequentially, and determining the RSRP of the received reference signal.

The UE receives reference signals transmitted by a transmitting beam by using at least two receiving beams, including: measuring the reference signal for N1 times by the first receiving beam and the second receiving beam alternately, wherein the first receiving beam is the active beam; when the UE detects that its rotation speed exceeds a threshold, measuring the reference signal for N2 times by the first receiving beam and the second receiving beam alternately, wherein the first receiving beam includes multiple predefined receiving beams; when the UE detects that its signal is blocked, measuring the reference signal for N3 times by the first receiving beam and its corresponding second receiving beam, wherein the measuring ratio of the first receiving beam and the second receiving beam is a predefined ratio, the first receiving beam includes multiple predefined receiving beams and active beams. N1, N2, and N3 are all positive integers.

The analysis result includes at least one of the following: predicted value of the state of each receiving beam of the UE; evaluation value of each receiving beam of the UE; beam ranking corresponding to each receiving beam of the UE; a candidate set of optimal receiving beams; long-term value when the receiving beam is an active beam; the beam to be measured or a measuring order; and the beamforming codebook to be used.

Also, before analyzing each RSRP by the predefined machine learning model, the method further includes:

arranging the multiple RSRPs according to a predefined format; and performing data preprocessing on the multiple RSRPs, respectively.

The performing data preprocessing includes at least one of the following: increasing an offset; downscaling data of a first predefined ratio; upscaling data of a second predefined ratio; increasing an offset and downscaling data of a first predefined ratio; increasing an offset and increasing the data of a second predefined ratio.

The predefined machine learning model includes a reinforcement-learning-based Q learning model. Q is a function that includes an artificial neural network model, wherein hidden layers of the neural network model include a bidirectional long short term memory network model.

A training method of the machine learning model includes: obtaining a predefined amount of original data; processing the original data based on a predefined reinforcement learning method to obtain corresponding training data; and training the machine learning model based on the training data to obtain a trained machine learning model.

The method further includes: performing corresponding beam management based on the beam management operation; refining corresponding parameters of the predefined machine learning model based on the processing result of the beam management to optimize the machine learning model.

Determining beam management operation corresponding to the transmitting beam includes at least one of the following: determining to switch the receiving beam at certain time; switching current receiving beam to the receiving beam to be switched determined by the beam state and/or the evaluation value; keeping the current receiving beam unchanged; whether to switch the beam; determining the receiving beam at the next or more measurement periods by the beam state and/or the evaluation value; whether to switch the beam and to change the beamforming codebook.

The UE is in carrier aggregation state, where multiple carrier components are included, each carrier component has a corresponding machine learning model; the UE receives reference signals transmitted by a transmitting beam by using at least two receiving beams, and determines RSRP of each receiving beam, including: for each carrier component, the UE receives reference signals transmitted by the transmitting beam by using at least two receiving beams corresponding to the corresponding carrier component, respectively, and determines the RSRP of each receiving beam; analyzing each RSRP respectively by the predefined machine learning model, including: analyzing each RSRP respectively by a machine learning model corresponding to the corresponding carrier component.

The manner of determining the receiving beam, includes: determining a beam pattern corresponding to each carrier component based on the codebook of each carrier component; determining the receiving beams respectively on each carrier component based on the determined beam patterns of the selected carrier component and the predefined beam selection rule of the selected carrier component.

When the UE receives multiple reference signals respectively transmitted on the multiple transmitting beam, the UE receives reference signals transmitted by a transmitting beam by using at least two receiving beams, and determines RSRP of each receiving beam, including: for any of the transmitting beams, the UE receives the reference signals transmitted by the transmitting beams by using at least two receiving beams, respectively, and determines the RSRP of each receiving beam; analyzing each RSRP respectively by the predefined machine learning model, including: for any one of the transmitting beams, analyzing each RSRP by the corresponding predefined machine learning model; determining beam management operation corresponding to the transmitting beam according to the analysis processing result, including: for any of the transmitting beams, determining beam management operation corresponding to the transmitting beams; wherein, the method further includes: when receiving transmission data from any of the transmitting beams, performing corresponding beam management according to a beam management manner operation corresponding to the transmitting beams.

The method further includes: when detecting that the transmitting beam of the transmission data is switched, performing the corresponding beam management based on the beam management operation of the switched transmitting beam of the transmission data.

In the following, the beam management method of the foregoing embodiment is fully and comprehensively introduced through the following specific embodiments:

In the above step S110, the UE receives the reference signal periodically transmitted by the transmitting beam of the base station on the receiving beam and the corresponding reference receiving beam, and performs measurement of the reference signal. Each time the base station transmits the reference signal, the UE selects a certain receiving beam or a reference receiving beam as the beam for receiving the reference signal, and measures the receiving power obtained on the receiving beam, for example, RSRP.

The UE measures the RSRP multiple times, selects the receiving beam at each measurement according to a certain order, and the measured power (for example, RSRP) is the receiving power value on the receiving beam. After several measurements, a set of receiving power values is obtained, wherein the set of receiving power values is combined into a particular format for use as data input in the subsequent step S120.

In the above step S120, the data obtained in step S110 (i.e., the above receiving power value) is subjected to analysis processing by a predefined machine learning model, and a corresponding predicted output result (i.e., analysis result) is obtained according to the purpose or needs. Before the data obtained in step S110 is input to the predefined machine learning model, the data is subjected to corresponding processing according to the used specific machine learning model to adapt to the input requirements of the model. The used machine learning model may be obtained by pre-training or it may be continuously trained and refined during the use of the machine learning model. Wherein, the machine learning model outputs a prediction about the evaluation result of the receiving beam (or a prediction result of the receiving beam) according to the purpose or needs of the specific UE or the network, which is the output result of the machine learning model.

In the above step S130, the UE performs a corresponding beam management operation according to the prediction result obtained in the above step S120, that is, determines beam management operation corresponding to the transmitting beam. Wherein, the beam management operation includes, but is not limited to, whether the UE needs to perform the switching of the active beam, which beam should be switched to when the beam switching is required, and which of the receiving beams to be used for measurement are selected next.

The embodiment, includes but is not limited to the above three steps, the three steps are sequentially performed, and finally the corresponding beam management operation is performed according to the measurement result of the UE, so that the UE maintains a good quality of the communication link by continually tracking and switching to the beam which satisfy the communication needs.

For the content of the above embodiment, one specific embodiment includes the following process steps: Step A, Step B and Step C.

Step A: the UE measures the reference signal (wherein the reference signal is transmitted by base station through the first transmitting beam (for example, Tx #8 in FIG. 2)) through the first receiving beam (fine beam) and the second receiving beam (broad beam) in N periods so that the RSRP is obtained.

Wherein, the UE measures the RSRP on a certain receiving beam in the fine beam or the broad beam during the period in which each reference signal is transmitted.

Step B: The UE obtains a corresponding prediction result by using the obtained the RSRP through a predefined algorithm model for machine learning.

Step C: According to the prediction result, the UE makes a beam management decision, for example, whether to switch the current active beam, and/or decide which beam to switch to, wherein the beam management decision here is the beam management operation corresponding to the transmitting beam.

Step A is described in detail below.

Figure 2:
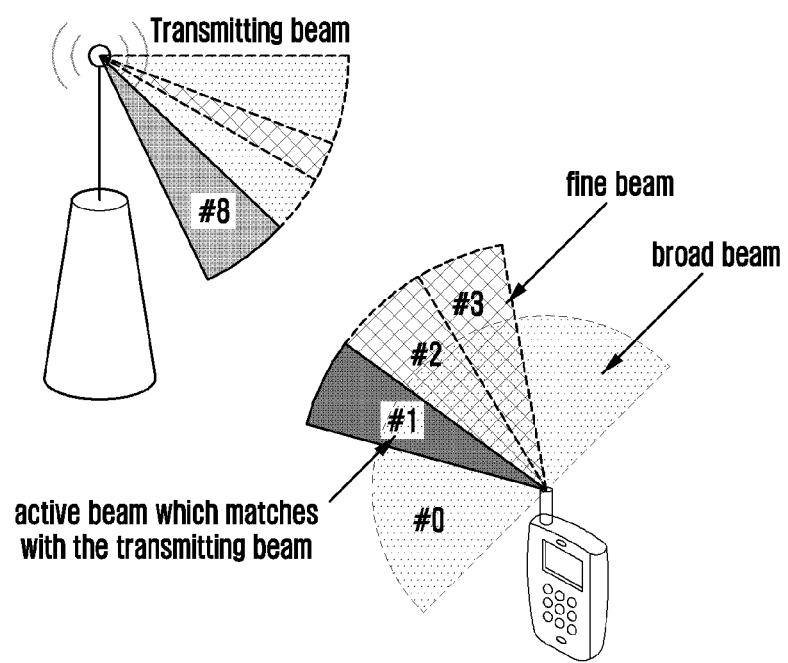
FIG. 2 is a schematic diagram of a transmitting/receiving beam and a beam distribution according to an embodiment.

FIG. 2 is a schematic diagram of a transmitting/receiving beam and a beam distribution according to an embodiment. As shown in FIG. 2, the UE is configured with multiple fine beams which cover the entire three-dimensional space range and are used for data transmission with the base station. The UE is also configured with a corresponding reference beam, for example, a broad beam, wherein the coverage of each broad beam may include several fine beams. The base station selects a certain beam as the transmitting beam (for example, Tx #8 in FIG. 2) for transmitting signals to the UE.

The base station transmits data in a certain period, and the base station specifically transmits a reference signal for synchronization, measurement, etc. in a period of time in each period. In other words, the base station will periodically transmit the reference signal to the UE on the transmitting beam in the period of time. Therefore, the UE may receive the reference signal transmitted by the base station through one receiving beam in each period.

Figure 3:
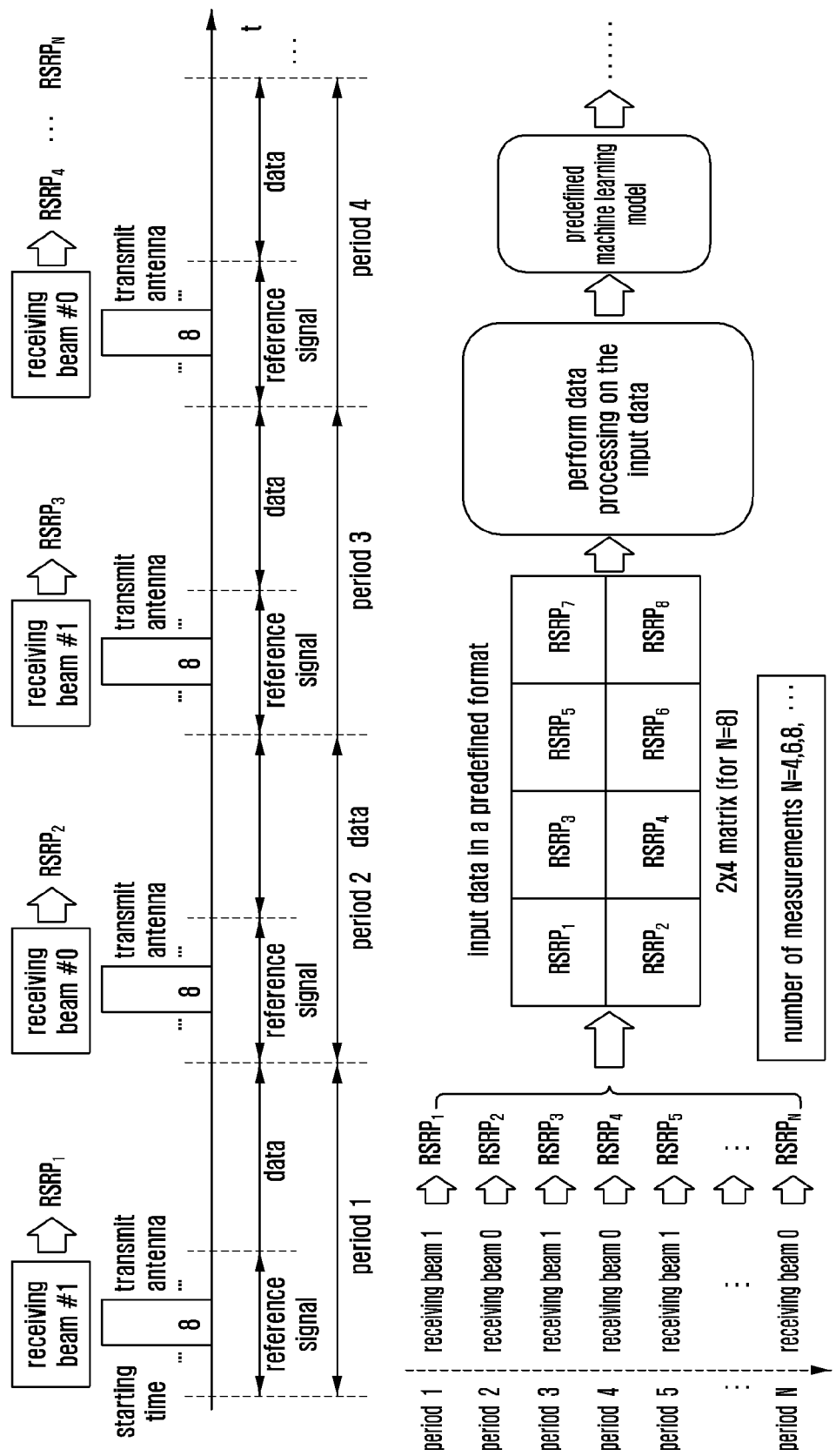
FIG. 3 is a schematic diagram of a reference signal transceived between a UE and a beam receiving base station in each measurement period according to an embodiment.

FIG. 3 is a schematic diagram of a reference signal in measurement periods according to an embodiment As shown in FIG. 3, step A may specifically include the following steps: A1 and A2.

Step A1: The UE receives the reference signal transmitted by the base station through one receiving beam in each of a plurality of periods to obtain the RSRP for each period.

For example, during the transmitting time of the first reference signal in period 1, the UE selects an active beam (which is a fine beam) currently used for data transmission to receive the reference signal and measure the RSRP. During the transmitting time of the second reference signal in period 2, the UE selects the reference beam (broad beam) corresponding to the active beam to receive the reference signal and measures the RSRP. During the transmitting time of the subsequent reference signals, the UE employs the same receiving manner as the above first reference signal and the second reference, and receives the reference signal and measures the RSRP by using the active beam (fine beam) and the reference beam (broad beam) sequentially, until the reception of the last N (for example, N=8) reference signals and the measurement of the RSRP are completed. Such a measurement method facilitates the subsequent extraction of the characteristics of the UE and the state changes of the UE during this period of time from the measured values of the RSRP.

Although the UE receives the reference signal transmitted by the base station through one receiving beam in each period and obtains the RSRP, for the reception of multiple reference signals of multiple periods, the UE receives the reference signals transmitted by the transmitting beam by using at least two receiving beams, and determines the RSRP of each receiving beam. The UE determines at least two receiving beams based on the current beam pattern and a predefined selection rule, and receives multiple reference signals by the determined at least two receiving beams and determines corresponding multiple RSRPs.

The beam pattern is a beam pattern formed by beamforming, and is determined by the antenna array configuration such as the size and position of the configured antenna array used by the UE, and the beamforming codebook used by the UE. A broad beam (second receiving beam) corresponding to a fine beam (first receiving beam) used for receiving reference signals refers to a broad beam covering the range of the fine beam.

Figure 4:
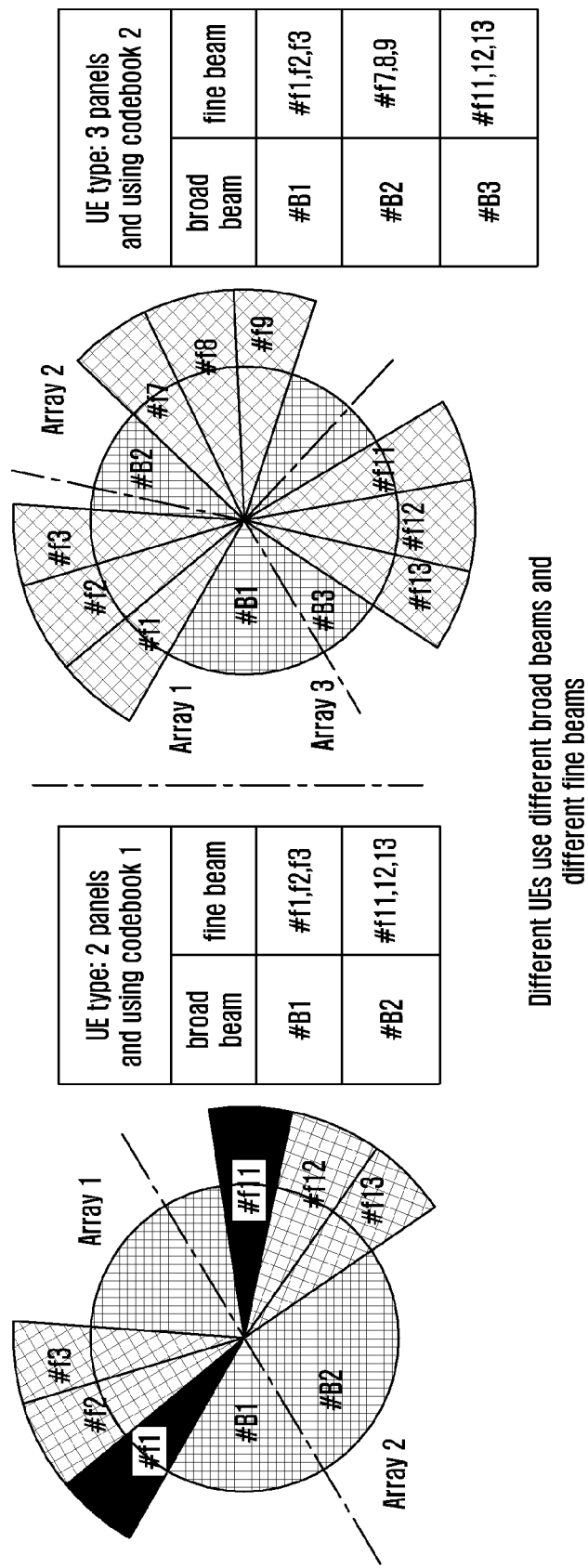
FIG. 4 is a schematic diagram of a beam pattern and a correspondence between a fine beam and a broad beam according to an embodiment.

The number of fine beams and broad beams and the correspondence between different fine beams and broad beams depend on the codebook used by the UE and the relative positional relationship between the fine beam and the broad beam. In other words, the correspondence between the first receiving beam and the second receiving beam changes as the antenna array configuration of the UE changes. Therefore, for different types of UE, the correspondence between the broad beam and fine beam may change, as shown in FIG. 4. The measurement of the fine beam and the corresponding broad beam in this way is advantageous for extracting characteristics of UE condition changes.

Figure 5:
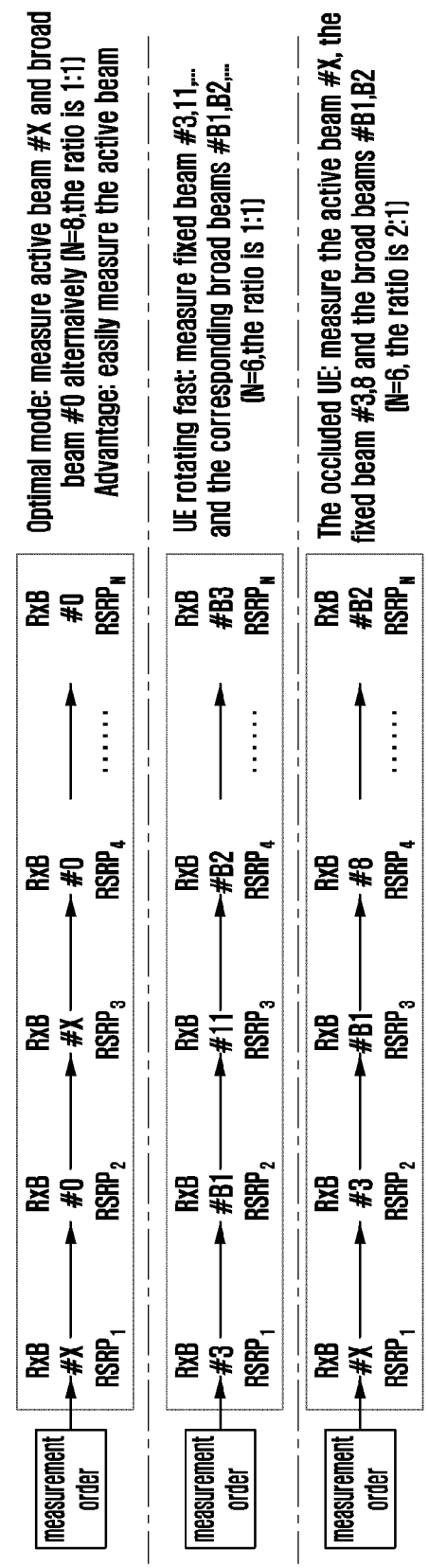
FIG. 5 is a schematic diagram of measurement of RSRPs of a UE in different environments according to an embodiment.

FIG. 5 is a schematic diagram of measurement of RSRPs of a UE in different environments according to an embodiment. As shown in FIG. 5, the measurement method in the above step A1 also differs according to the conditions of the UE and the environment in which the UE is located. Wherein, the above measurement method includes the number of measurements N, the order in which the first receiving beam and the second receiving beam are sequentially measured (i.e., the receiving beam order of the first receiving beam and the second receiving beam), the receiving beam selection for each measurement, the ratio between the receiving beam and the reference receiving beam (i.e., the receiving beam ratio of the first receiving beams to the second receiving beams).

In the first case, as in the above step A1, the selected receiving beam is measured, and the receiving beam alternates between measuring the fine beam and the corresponding broad beam, and the number of measurements is N=8, the measurement ratio between the fine beam and the broad beam is 1:1. That is, the UE measures the reference signals for N1 times by the first receiving beam and the second receiving beam alternatively, wherein the first receiving beam is an active beam, and N1 is a positive integer.

In the second case, when the UE is in a fast-rotating state, for example, when the UE detects that its rotational speed exceeds a threshold, the selected receiving beam to be measured is a fixed fine beam (i.e., a predefined fine beam) and its corresponding broad beam. The receiving beam order for measurement is to measure the fixed fine beam and its corresponding broad beam alternatively, the number of measurements is N=6, and the measurement ratio between the fine beam and the broad beam is 1:1. That is, when the UE detects its rotational speed exceeds a threshold, the UE measures the reference signals for N2 times by using the first receiving beams and the second receiving beam alternatively, wherein the first receiving beam includes multiple predefined receiving beams, and N2 is a positive integer.

In the third case, when the UE may be in a state of more occlusion around, for example, when the UE detects that its signal is blocked, the selected receiving beam to be measured is the currently active fine beam (i.e., the active beam), fixed fine beam (i.e., the predefined fine beam) and the broad beam corresponding to the currently selected active beam and the predefined fine beam. The receiving beam order for measurement is to measure the active beam, the fixed fine beam and the broad beam at intervals, and the number of measurements is N=6, the measurement ratio between the fine beam and the broad beam is 2:1. That is, when the UE detects that its signal is blocked, the UE measures the reference signals for N3 times through the first receiving beam and the corresponding second receiving beam, wherein the measurement ratio of the first receiving beam and the second receiving beam is 2:1, and the first receiving beam includes multiple predefined receiving beams and active beams, and N3 is a positive integer.

The measurement methods in the above three cases will bring better beam state prediction effects under the corresponding conditions and occasions. It should be noted that the embodiment only introduces the beam management method by using the above three cases as examples, but is not limited to the above three cases. In the actual application environments, the method may also be adjusted flexibly according to the above three cases.

In addition, the numbers N1, N2, and N3 of measurements of the reference signals may be predefined according to the needs, or may be calculated according to the measurement time length K1 and the period T for transmitting data by the base station, for example, $K_1$ is 5 ms (millisecond), T is 1 ms, the number of measurements is $K_1/T=5$, that is, measuring for 5 times, and if $K_1$ is 10 ms and T is 1 ms, the number of measurements is $K_1/T=10$, that is, measuring for 10 times.

Step A2: Arranging the measured multiple RSRPs according to a predefined format, and performing data preprocessing on the measured multiple RSRPs, respectively.

Specifically, for the reference signal measured at each period, there is a corresponding RSRP. The multiple measured RSRPs may be arranged in a predefined format according to the needs of the subsequently used machine learning model. For example, the measured N (N=8) RSRPs are combined into a matrix form of two row and four columns, the matrix form is used as an input of the machine learning model so as to arrange the RSRP into a specific form to meet the needs of subsequent machine learning models for analyzing the data.

Specifically, after the UE measures the obtained multiple RSRPs, the UE performs corresponding data preprocessing on the obtained multiple RSRPs according to the needs of the subsequently used machine learning model to increase the reliability and accuracy of the model mapping data. Wherein, the data preprocessing includes at least one of the following: increasing an offset; downscaling data of a first predefined ratio; upscaling data of a second predefined ratio; increasing an offset and downscaling data of a first predefined ratio; increasing an offset and increasing the data of a second predefined ratio. In any of the following, multiple RSRPs subjected to data pre-processing are input into the machine learning model.

Figure 6:
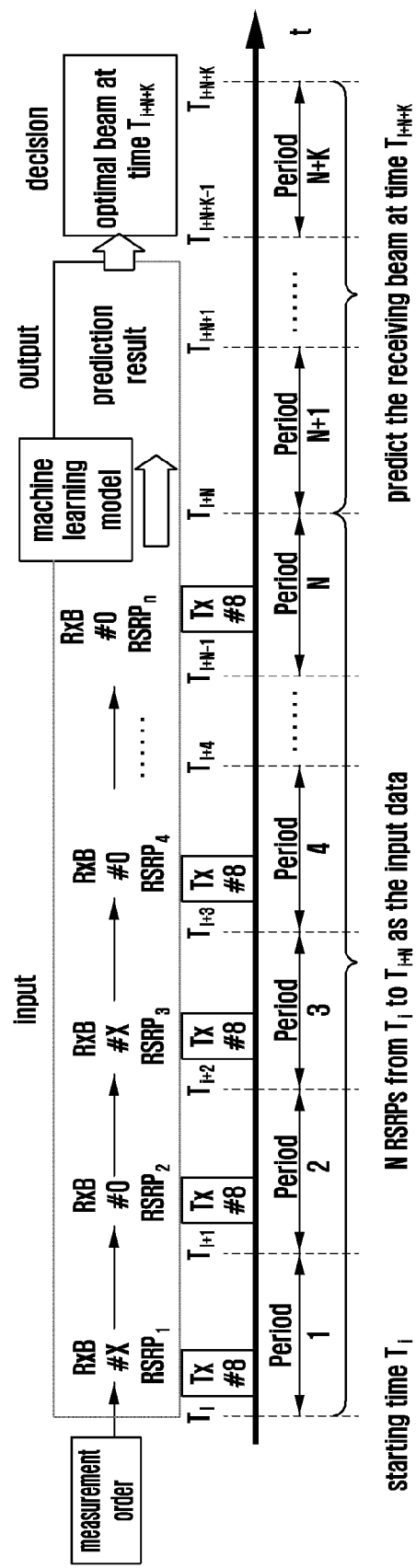
FIG. 6 is a schematic diagram of mapping the input data into an output result by a machine learning processing model according to an embodiment.

FIG. 6 is a schematic diagram of mapping the input data into an output result by a machine learning processing model according to an embodiment. As shown in FIG. 6, in the above step B, the process of analyzing each RSRP by using a predefined machine learning model may include the following steps. In the process, the multiple RSRPs arranged in a predefined format and subjecting to the data preprocessing are respectively input into a predefined machine learning model, are analyzed by the predefined machine learning model, the corresponding analysis result is output, and the analysis result is the output of the predefined machine learning model.

Wherein, each receiving beam state of the output result is the predicted value (i.e., the analysis result of each receiving beam) of the beam state of each receiving beam of the UE at the $K^{th}$ time (for example, K=1) after the end of the measurement time length. The beam state is the state that when the receiving beam is selected as the active beam for data transmission, the long-term value may be obtained. Wherein, the long-term value of the output may be used as a criterion for evaluating the receiving beam, and is used as a basis for subsequently determining the beam management operation corresponding to the transmitting beam.

In addition, according to other needs in the actual application process, the output result of the machine learning model at the $K^{th}$ time after the measurement ends may be: the evaluation value of each receiving beam of the UE, the ranking of the evaluation values of each receiving beam of the UE, and the candidate set of the optimal receiving beams, the long-term value when the receiving beam is the active beam and the like. Wherein, K represents the length of time of the prediction, which may be changed according to different needs, thereby predicting the required results of each receiving beams within the corresponding time length, so that the method can be applied to different cases and needs.

Figure 7:
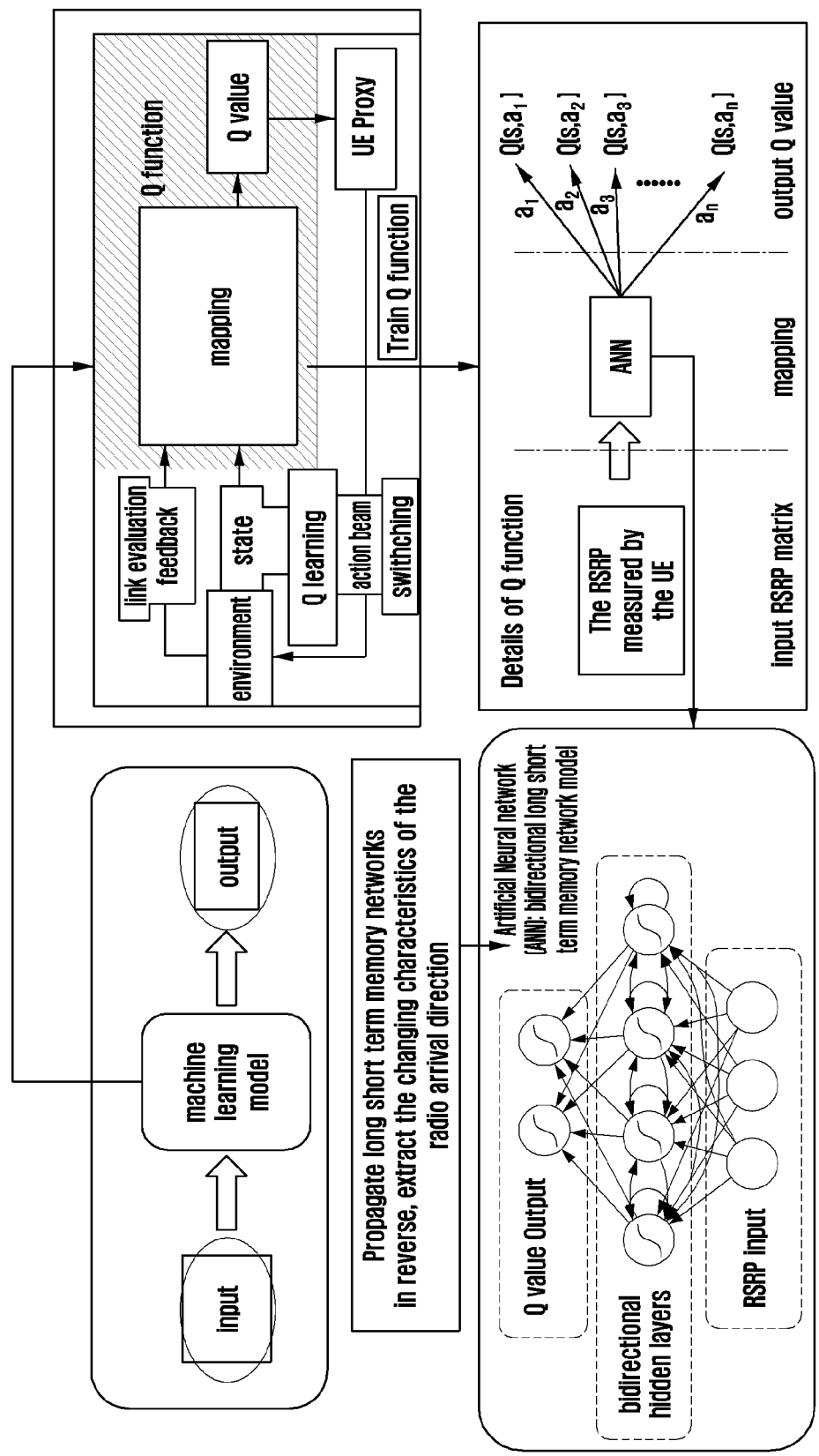
FIG. 7 is a schematic diagram of a reinforcement-learning-based neural network model of a Q function according to an embodiment.

FIG. 7 is a schematic diagram of a reinforcement-learning-based neural network model of a Q function according to an embodiment. The predefined machine learning model includes a reinforcement-learning-based neural network model of a Q function described above, the neural network model is bidirectional long short term memory network model. In other words, the predefined machine learning model used in the embodiment may be a Q learning model in reinforcement learning, as shown in FIG. 7. Wherein, the Q function used in the Q learning model is a mapping function of the artificial neural network model for input to output. Wherein, the input data of the predefined machine learning model is the multiple RSRPs arranged in a predefined format and subjecting to the data preprocessing, and the output data is a long-term value (or referred as a long-term reward) when selecting different receiving beams as the active beam). It should be noted that the input data and the output data at this time are specifically designed for the method in this case.

The above artificial neural network model may specifically be bidirectional long short term memory network with multiple hidden layers, and the artificial neural network model can extract the variation characteristics of the radio wave arrival angle of the UE, and strengthen these characteristics according to the inverse relationship to make it more accurate.

Further, the above artificial neural network model is obtained through online or/and offline training. Wherein, the offline training process is to obtain the trained artificial neural network model according to the conditions of the UE, such as the antenna array configuration, the beam direction, etc. before the UE uses by pretraining the artificial neural network model; the online training process may further train or optimize the pre-trained artificial neural network model according to the actual application scenario of the UE, so as to further optimize the performance and improve the effect according to the current usage habits of the UE and the environment where the UE is located.

Further, the offline training process of the artificial neural network model may be: first, the UE generates (or collects) data required for the training, and creates the original data set, that is, the UE acquires a predefined amount of the original data; then, the UE further creates a training data set according to the collected original data set through a predefined reinforcement learning method, that is, processes the original data based on a predefined reinforcement learning method to obtain the corresponding training data. Wherein the predefined reinforcement learning method refers to inputting the training data set into the original bidirectional long short term memory network, and continuously optimizing and training the network parameters of the original bidirectional long short term memory network to gradually approach the target bidirectional long short term memory network so as to train the original bidirectional long short term memory network. During the training process, the input data of the two networks is different, the data is the current state information and the next time state information, respectively. The parameters of the target network are updated to the parameters of the current training network with a certain frequency. Wherein, the meanings of the current state, the current action, and the next time state expressed in the present embodiment will be given a specific definition later. In the process of approximation, the back-propagation algorithm is used to update the parameters of the training network. The gap between the two networks (i.e., the original bidirectional long short term memory network and the target bidirectional long short term memory network) can be measured by the Bellman function. When the gap is within the allowable range of certain error, the training of the original bidirectional long short term memory network is stopped, that is, the training ends.

Wherein, in the above process, the process that the training network approaches to the target network may be expressed by using the following math formula, that is:

$$Q^*(s, a) \leftarrow E_{s'}\left[r + \gamma \cdot \max_{a'} Q^*(s', a') \mid s, a\right]$$

Where Q(s, a) indicates the long-term reward value Q is obtained when the current state is s and the UE action is a; Q* is the maximum value of all possible Q values; $E_s[x]$ indicates x is the Expectation when s is a certain random variables; y is the constant coefficient selected during training; s' indicates the state of the next time of the current state; $\max_a(x)$ indicates the maximum value of x when selecting the optimal a; a' is the UE action at next time s', the symbol "|" is a prerequisite; "←" indicates that the value on the right side is trying to approach to the left side. At this time, the difference between the above two networks may be expressed using the following math formula, that is:

$$loss = \left(r + \gamma \cdot \max_{a'} Q(s', a', w_1) - Q(s, a, w_2)\right)^2$$

Where $w_1$ is the parameter value of the target network; $w_2$ is the parameter value of the current network.

Figure 8:
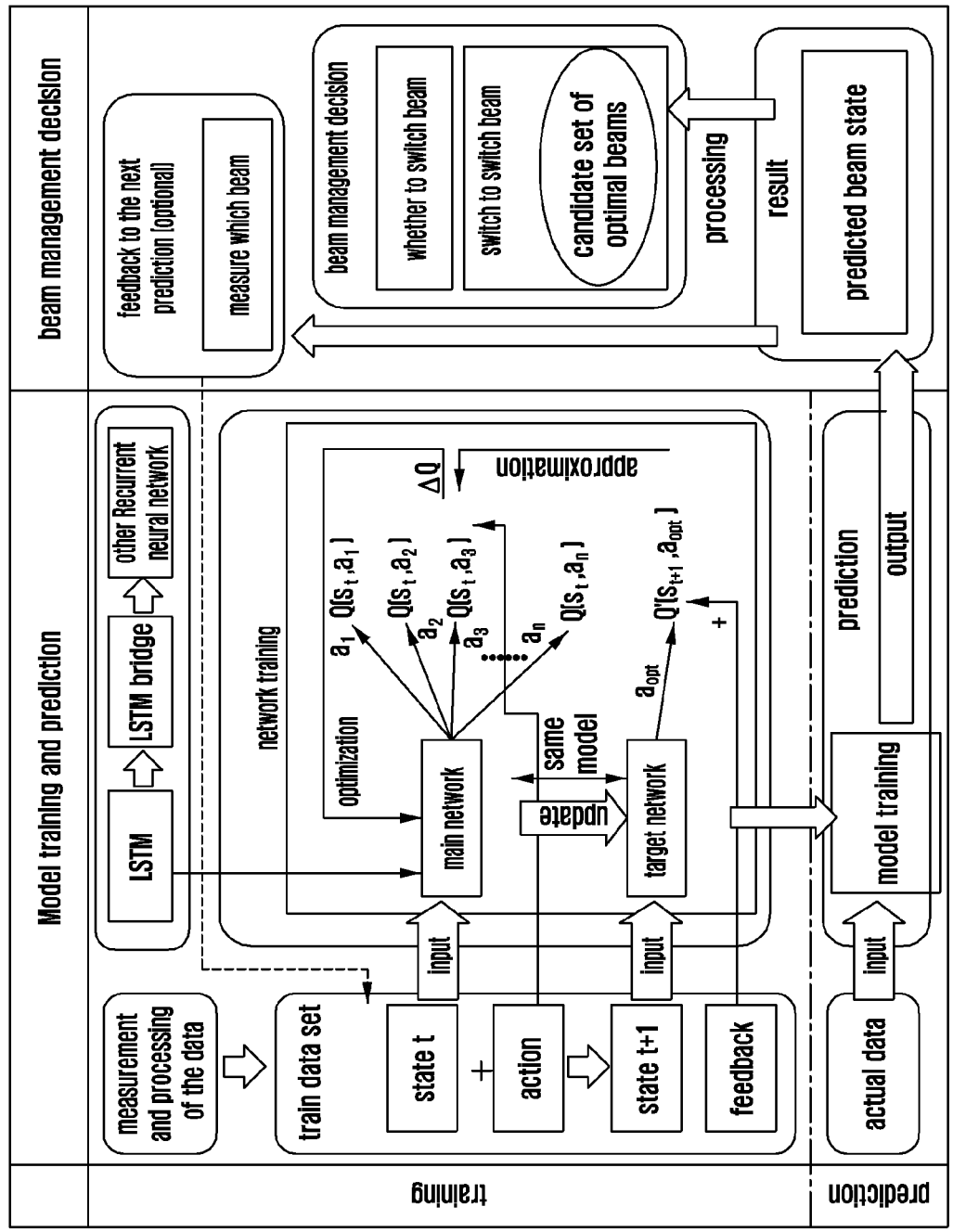
FIG. 8 is a schematic diagram of a relationship between a training process of a machine learning module, a network prediction, and a beam management decision according to an embodiment.

FIG. 8 is a schematic diagram showing the relationship between the training process of artificial neural network and the network prediction and the beam management decision according to an embodiment. This training method may optimize and adjust the network parameters according to the specific usage habits and usage scenarios of specific UE on the basis of satisfying the needs of the UE, thereby maintaining a better link effect.

Further, the above training data set contains millions of orders of training data. As shown in FIG. 8, each piece of training data includes four parts: a current state ($state_t$, that is, a state t in FIG. 8), a UE action ($Action_t$, that is, an action in FIG. 8), and a next time state ($state_{t+1}$, that is the state t+1 in FIG. 8) and the environment feedback rewards and/or penalties (that is, the feedback in FIG. 8). Wherein, the above current state ($state_t$) is a matrix form which is combined by the RSRPs of each receiving beam measured by the above UE; the above UE action ($Action_t$) is that the UE performs switching the active receiving beam after the measurement is completed; the above next time state ($state_{t+1}$) is the RSRP of the receiving beam after the switching is completed, and the form is still the same matrix form as the current state; the above environment feedback rewards and/or penalties is a good effect or a bad effect for the received beam after switching.

It should be noted that when predicting the beam state in actual use, only one part of the above "current state" acts as the input value of the prediction. A long-term evaluation value corresponding to each switch method may be obtained as a subsequent beam management operation by using such data for training or using such data as the predicted input.

In the above step C, the UE makes a beam management decision, including but not limited to the following: (1) at the $K^{th}$ time after the measurement, the current receiving beam should be kept unchanged, that is, no beam switching is performed; (2) switching to a new and better receiving beam to maintain a high-quality link.

Wherein, the beam management decision is a specific beam management operation made according to a prediction result given by a predefined machine learning model, for example, a predicted receiving beam having the highest long-term value is used as a receiving beam that should be switched at the $K^{th}$ time after the measurement. For another example, when the receiving beam to be switched has the same long-term value as the current receiving beam, the current receiving beam is maintained, that is, the receiving beam is not switched. Still for another example, when the long-term value of the receiving beam to be switched is obviously higher than that of the current receiving beam, the current receiving beam is switched to the receiving beam to be switched, that is, the beam switching is performed, and the receiving beam to be switched is used as the current receiving beam.

It should be noted that, in practical applications, according to the needs of different UEs, in other cases, the possible beam management decisions include: determining whether to switch, or maintaining the current receiving beam (which may be determined based on the comparison between the evaluation state of the predicted current active beam and the predefined threshold value), or determining the receiving beam to be measured in the next measurement period (which can be selected according to the candidate set of optimal receiving beams provided according to the output result), or may be other beam management decisions in the related art, which are not limited in the embodiments. In other words, determining beam management operation corresponding to the transmitting beam includes any one of: determining to switch the receiving beam at certain time; switching current receiving beam to the receiving beam to be switched determined by the beam state and/or the evaluation value; keeping the current receiving beam unchanged; whether to switch the beam; determining the receiving beam at the next one or more measurement periods by the beam state and/or the evaluation value.

The overall process of the embodiment includes: inputting the processed RSRP of each receiving beam determined by the UE into the trained artificial neural network model, obtaining the prediction result of the RSRP of each receiving beam through the trained artificial neural network model, and making the corresponding beam management decisions according to the prediction result to maintain a high-quality communication link. Specifically, the overall process includes:

1. The UE sequentially measures the RSRP of the reference signal on the first receiving beam or the second receiving beam in a certain order in each measurement period, and makes multiple measurements to obtain the multiple RSRPs;
2. The UE arranges the obtained multiple RSRPs and performs the data pre-processing on the obtained multiple RSRPs, the obtained multiple RSRPs arranged and subjecting to the data pre-processing are used as the input data of a predefined machine learning model;
3. The machine learning model maps the aforementioned input data to a corresponding output result after measuring the sufficient input data each time, wherein the output result is a predicted beam state of the receiving beam;
4. The UE makes a corresponding beam management decision according to the prediction result;
5. The UE reselects and switches the active beam currently used for data transmission when necessary, and maintains a good link communication quality as much as possible to avoid the link interruption.

The method according to the embodiment can efficiently track the optimal receiving beam of the UE according to a limited amount of RSRPs, predict the possible beam pair mismatch in advance, and perform optimal beam reselection and switching in advance. Compared with the related art, less time and fewer wireless resources are used, high-reliability time prediction is generated, and the optimization and adjustment can be performed according to the usage condition of the specific UE, and can be applied not only to the case where the surrounding environment changes very fast, but can also provide effective recommendations for subsequent the receive beam measurement.

According to another embodiment, the base station is configured with multiple transmitting antenna beams to transmit multiple reference signals. In this case, the UE receives the multiple reference signals on the multiple transmitting beams, wherein: when the UE receives the multiple reference signals respectively transmitted on the multiple transmitting beams, the UE receives reference signals transmitted by a transmitting beam by using at least two receiving beams, and determines RSRP of each receiving beam. The UE receives the reference signals transmitted by the transmitting beams by using at least two receiving beams, respectively, and determines the RSRP of each receiving beam. The UE analyzes each RSRP respectively by the predefined machine learning model. The UE analyzes each RSRP by the corresponding predefined machine learning model; determines a beam management operation corresponding to the transmitting beam according to the analysis processing result.

The UE, when receiving transmission data from any of the transmitting beams, performs corresponding beam management according to a beam management manner operation corresponding to the transmitting beams.

Specifically, the method performed by the UE may further include the following steps.

When detecting that the transmitting beam for data transmission is switched, performing corresponding beam management based on the beam management operation corresponding to the switched transmitting beam for data transmission.

Figure 9:
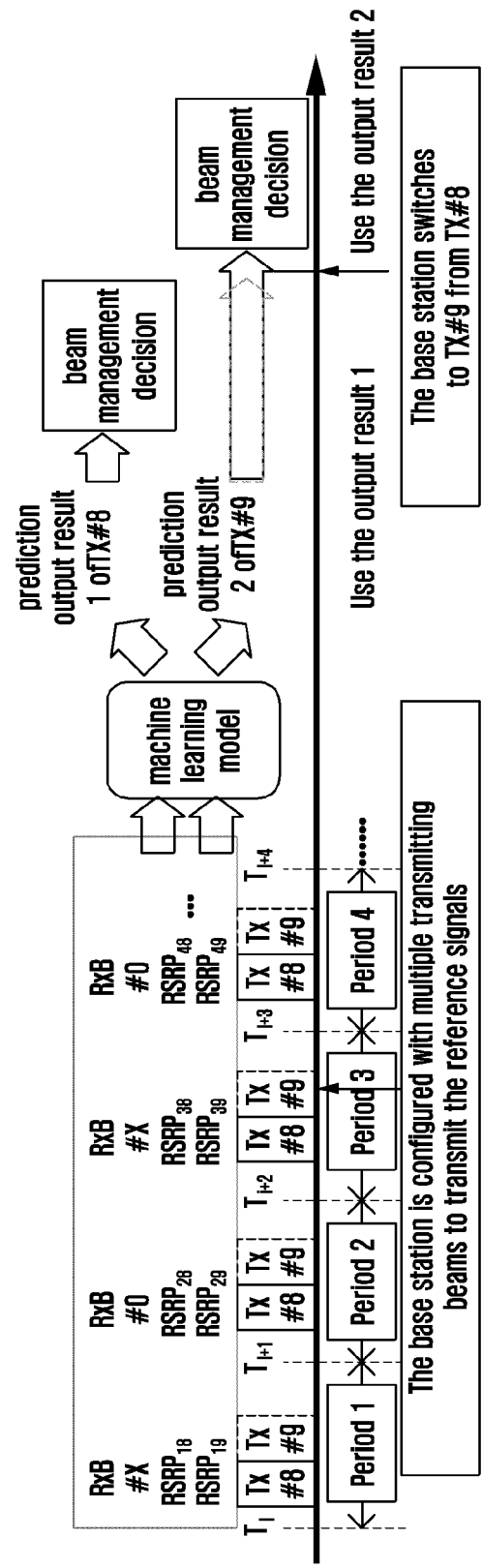
FIG. 9 is a schematic diagram of the UE receiving multiple reference signals transmitted by multiple transmitting beams according to an embodiment.

Specifically, when the base station configures multiple reference signals on the multiple transmitting beams for the UE, the implementation process of the UE and the difference from the above embodiment are shown in FIG. 9.

Step 1: Perform the measurement process similar to the process described in the above step A, but the method is different. Specifically, when measuring, the UE not only measures the reference signal from one transmitting beam, but measures the multiple reference signals from different transmitting beams in one period. For example, in the first measurement period, the UE measures the reference signals of the transmitting beam Tx #8 by the receiving beam X and obtains the corresponding RSRP (for example, RSRP18), and measures the reference signals of the transmitting beam Tx #9 by the receiving beam X and obtains the corresponding RSRP (for example, RSRP19). In the second measurement period, the UE measures the reference signals of the transmitting beam Tx #8 through the receiving beam 0 and obtains the corresponding RSRP (for example, RSRP28), and measures the reference signals of the transmitting beam Tx #9 through the receiving beam 0 and obtains the corresponding RSRP (for example, RSRP29). In the third measuring period, the UE measures the reference signals of the transmitting beam Tx #8 through the receiving beam X and obtains the corresponding RSRP (for example, RSRP38), and measures the reference signals of the transmitting beam Tx #9 through the receiving beam X and obtains the corresponding RSRP (for example, RSRP39). In the fourth measurement period, the UE measures reference signals of the transmitting beam Tx #8 through the receiving beam 0 and obtains the corresponding RSRP (for example, RSRP48), and measures the reference signals of the transmitting beam Tx #9 through the receiving beam 0 and obtains the corresponding RSRP (for example, RSRP49), and the like.

Step 2: Perform the prediction process of the predefined machine learning model similar to the process in the foregoing step B, but the method is different. Specifically, the RSRPs of the two reference signals respectively measured form the corresponding input data and are respectively input into the current machine learning model to obtain respective prediction results. For example, the received reference signals RSRP18, RSRP28, RSRP38, RSRP48, etc. of the transmitting beam Tx #8 form the corresponding input data input into the current machine learning model to obtain a corresponding prediction result P1; the received reference signals RSRP19, RSRP29, RSRP39, RSRP49, etc. of the transmitting beam Tx #9 form the corresponding input data and is input into the current machine learning model to obtain a corresponding prediction result P2.

Step 3: Perform the beam management operation process similar to the process in the previous step C, but the method is different. Specifically, in the multiple prediction results obtained above, the prediction result obtained by using the reference signal measurement value on the transmitting beam for data transmission configured by the base station is used to make a subsequent beam management decision process. If the base station configures two transmitting antenna beams Tx #8 and Tx #9, respectively, which are used to transmit multiple reference signals, and the prediction result measured by the UE based on the RSRP of Tx #8 is P1, and the prediction result measured based on the RSRP of Tx #9 is P2, then: (1) if the base station transmits the reference signal on Tx #8 and performs data transmission, the reference signal is only transmitted on Tx #9, and the data transmission is not performed, then the UE makes a specific beam management decision according to the prediction result P1. It is assumed that the base station switches the beam for data transmission; (2) if the beam of the base station for data transmission is switched, for example, switching from Tx #8 to Tx #9, the UE makes a specific beam management decision according to the prediction result P2. That is, the UE performs a specific beam management operation according to the prediction result of the RSRP of the transmitting beam for data transmission.

According to another embodiment, the UE configures a carrier aggregation of multiple carrier components. In this case, each carrier component has a corresponding machine learning model and each machine learning model performs the following processing.

A UE receives reference signals transmitted by a transmitting beam by using at least two receiving beams, and determines RSRP of each receiving beam, including: for each carrier component, the UE receives reference signals transmitted by the transmitting beam by using at least two receiving beams corresponding to the corresponding carrier component, respectively, and determines the RSRP of each receiving beam.

The UE analyzes each RSRP respectively by the predefined machine learning model, including: analyzing each RSRP respectively by the machine learning model corresponding to the corresponding carrier component.

Specifically, the manner of determining the receiving beam includes: determining a beam pattern corresponding to each carrier component based on the codebook of each carrier component; and determining the receiving beams respectively on each carrier component based on the determined beam patterns of the selected carrier component and the predefined beam selection rule of the selected carrier component.

Figure 10:
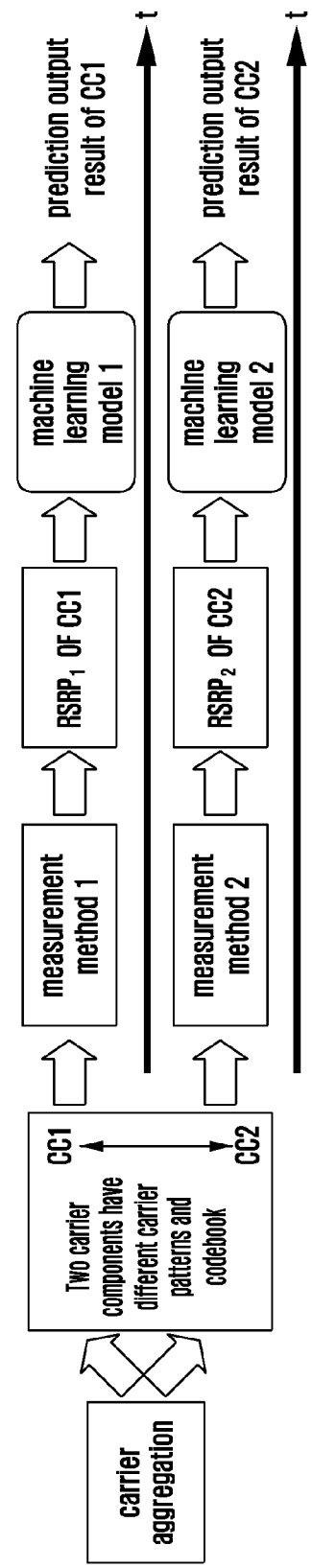
FIG. 10 is a schematic diagram of the UE receiving multiple reference signals of the transmitting bean based on multi-carrier aggregation according to an embodiment.

FIG. 10 is a schematic diagram of the UE receiving multiple reference signals of the transmitting bean based on multi-carrier aggregation according to an embodiment. The implementation process of the UE and the difference from the foregoing embodiment are discussed below.

Step 4: Perform the measurement process similar to the process described in the previous step A, but the method is different. Specifically, the UE may use different codebooks for different carrier components, generate different beam coverage patterns, and measure the reference signal power by the receiving beams formed according to respective beam patterns of respective carrier components. For example, the beam cover pattern of the carrier component CC1 is pattern1, and the beam cover pattern of the carrier component CC2 is pattern2. In this case, the UE selects the receiving beams according to pattern1 on the carrier component CC1, and the UE selects the receiving beam according to pattern2 on the carrier component CC2.

Step 5: Perform the prediction process of the predefined machine learning model similar to the process in the above step B, but the method is different. Specifically, the UE will provide machine learning models with different parameters for measuring the data (i.e., RSRP) on different carrier components, wherein the parameters of each machine learning model are optimized according to the carrier. For example, the machine learning model corresponding to the carrier component CC1 is model, and the machine learning model corresponding to the carrier component CC2 is mode2. The measurement data of each carrier component is input into the corresponding machine learning model to obtain a corresponding prediction result. For example, each RSRP of the carrier component CC1 is input into the machine learning model model corresponding to CC1 to obtain the prediction result R1 for CC1, and each RSRP of the carrier component CC2 is input into the machine learning model mode 2 corresponding to CC2 to obtain the prediction result R2 for CC2.

Step 6: Perform the process of beam management operation similar to the process in the above step C, but the method is different. Specifically, the prediction result obtained by the machine learning model corresponding to each carrier component is used as a beam management operation of the UE on different carrier components. For example, the UE determines the beam management decision on CC1 according to the prediction result R1 of CC1, and the UE determines the beam management decision on CC2 according to the prediction result R2 of CC2.

Figure 11:
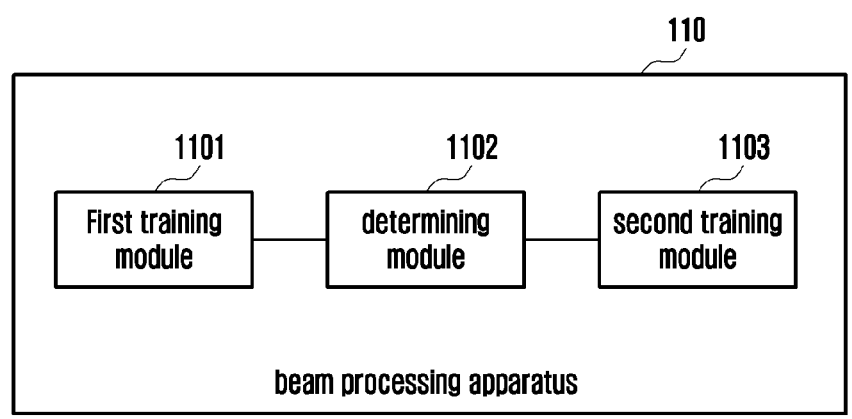
FIG. 11 is a basic schematic structural diagram of a beam processing apparatus according to an embodiment.

FIG. 11 is a schematic structural diagram of a beam processing apparatus according to another embodiment. As shown in FIG. 11, the apparatus 110 includes a processing module 1101, an analyzing module 1102 and a determining module 1103.

The processing module 1101 is configured to receive reference signals transmitted by a transmitting beam by using at least two receiving beams, and determines RSRP of each receiving beam. The analyzing module 1102 is configured to analyze each RSRP respectively by the predefined machine learning model. The determining module 1103 is configured to determine beam management operation corresponding to the transmitting beam based on the analysis result.

Figure 12:
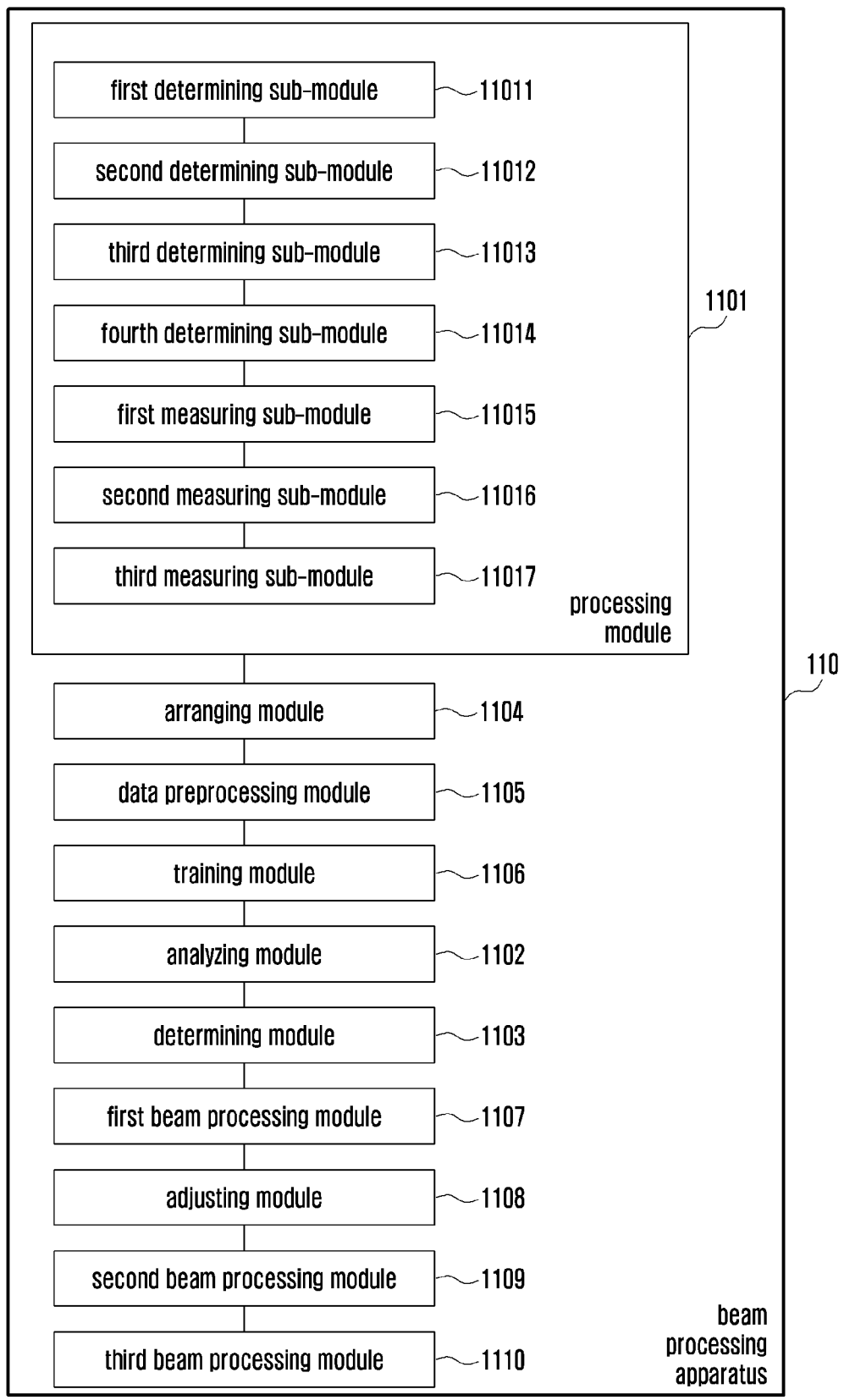
FIG. 12 is a detailed schematic structural diagram of a beam processing apparatus according to an embodiment.

FIG. 12 is a detailed schematic structural diagram of a beam processing apparatus 110 according to an embodiment. As shown in FIG. 12., the processing module 1101 includes a first determining sub-module 11011, a second determining sub-module 11012, a third determining sub-module 11013, a fourth determining sub-module 11014, a first measuring sub-module 11015, a second measuring sub-module 11016 and a third measuring sub-module 11017.

The first determining sub-module 11011 is configured to determine at least two receiving beams based on current beam pattern and a predefined selection rule. The second determining sub-module 11012 is configured to receive multiple reference signals through the at least two receiving beams, and determine multiple corresponding RSRPs.

Specifically, the at least two receiving beams include a first receiving beam, and a second receiving beam covering the range of the first receiving beam.

Specifically, the first receiving beam includes an active beam and/or a predefined receiving beam of the UE.

Specifically, a correspondence between the first receiving beam and the second receiving beam changes as an antenna array information of the UE changes.

The third determining sub-module 11013 is configured to determine receiving beam ratio of the first receiving beams to the second receiving beams and receiving beam order of the first receiving beams and the second receiving beams. The fourth determining sub-module 11014 is configured to receive the corresponding reference signal according to the receiving beam ratio and the receiving beam order by using the determined at least one first receiving beam and the determined second receiving beam sequentially, and determine the RSRP of the received reference signal.

The first measuring sub-module 11015 is configured to measure the reference signal for N1 times by using the first receiving beam and the second receiving beam alternately, wherein the first receiving beam is the active beam. The second measuring sub-module 11016 is configured to measure the reference signal for N2 times by using the first receiving beam and the second receiving beam alternately when the UE detects that its rotation speed exceeds a threshold, wherein the first receiving beam includes multiple predefined receiving beams. The third measuring sub-module 11017 is configured to measure the reference signal for N3 times by the first receiving beam and its corresponding second receiving beam, when the UE detects that its signal is blocked, wherein the measuring ratio of the first receiving beam and the second receiving beam is a ratio of 2:1, the first receiving beam includes multiple predefined receiving beams and active beams. N1, N2, and N3 are all positive integers.

The analysis result includes at least one of the following: a predicted value of the state of each receiving beam of the UE; an evaluation value of each receiving beam of the UE; a beam ranking corresponding to each receiving beam of the UE; a candidate set of optimal receiving beams; and a long-term value when the receiving beam is active beam.

The beam processing apparatus 110 further includes an arranging module 1104 and a data preprocessing module 1105.

The arranging module 1104 is configured to arrange the multiple RSRPs according to a predefined format. The data preprocessing module 1105 is configured to perform data preprocessing on the multiple RSRPs, respectively.

The data preprocessing includes at least one of the following: increasing an offset; downscaling data of a first predefined ratio; upscaling data of a second predefined ratio; increasing an offset and downscaling data of a first predefined ratio; increasing an offset and increasing the data of a second predefined ratio.

The predefined machine learning model includes a reinforcement-learning-based neural network model of Q function, the neural network model is bidirectional long short term memory network model.

As shown in FIG. 12, the beam processing apparatus 110 further includes a training module 1106. The training module 1106 is configured to obtain a predefined amount of original data; to process the original data based on a predefined reinforcement learning method to obtain corresponding training data; and to train the machine learning model based on the training data to obtain a trained machine learning model.

As shown in FIG. 12, the apparatus further includes a first beam processing module 1107 and an adjusting module 1108.

The first beam processing module 1107 is configured to perform corresponding beam processing according to the beam management operation; and the adjusting module 1108 is configured to adjust corresponding parameters of the predefined machine learning model based on the processing result of the beam processing to optimize the machine learning model.

The determining module 1103 is specifically configured to perform at least one of the following: determining to switch the receiving beam at certain time; switching current receiving beam to the receiving beam to be switched determined by the beam state and/or the evaluation value; keeping the current receiving beam unchanged; determining whether to switch the beam; determining the receiving beam at the next one measurement periods by the beam state and/or the evaluation value.

The UE includes multiple carrier aggregations, and each carrier aggregation has a corresponding machine learning model.

The processing module 1101 is specifically configured to: for each carrier aggregation, the UE receives reference signals transmitted by the transmitting beam by using at least two receiving beams corresponding to the any carrier aggregation, respectively, and determines the RSRP of each receiving beam.

The analyzing module 1102 is configured to analyze each RSRP respectively by a machine learning model corresponding to the any carrier aggregation.

The processing module 1101 is specifically configured to determine a beam pattern corresponding to each carrier aggregation based on the codebook of each carrier aggregation; and determine at least two receiving beams respectively corresponding to each carrier aggregation based on the determined beam patterns of the selected carrier component and the predefined beam selection rule of the selected carrier component.

When the UE receives multiple reference signals respectively transmitted on the multiple transmitting beam, the processing module 1101 is specifically configured to: for any of the transmitting beams, the UE receives the reference signals transmitted by the transmitting beams by using at least two receiving beams, respectively, and determines the RSRP of each receiving beam. The analyzing module 1102 is specifically configured to for any of the transmitting beams, analyze each RSRP by a predefined machine learning model. The determining module 1103 is specifically configured to for any of the transmitting beams, determine beam management operation corresponding to the transmitting beams.

The beam apparatus further includes a second beam processing module 1109, as shown in FIG. 12, wherein;
the second beam processing module 1109 is specifically configured to: when receiving transmission data from any of the transmitting beams, perform corresponding beam processing according to a beam processing manner corresponding to the transmitting beams.

The beam processing apparatus 110 further includes a third beam processing module 1110, as shown in FIG. 12.

The third beam processing module 1110 is specifically configured to: when detecting that the transmitting beam for the transmission data is switched, perform the corresponding beam processing based on the beam processing manner of the switched transmitting beam of the transmission data.

The UE provided by the embodiment receives the reference signals transmitted by the transmitting beams by using at least two receiving beams, and determines the RSRP of each receiving beam, analyzes each RSRP by a predefined machine learning module, and determines a beam processing manner corresponding to the transmitting beam so as to determine the corresponding beam processing manner fast and accurately according to the transmitting beam by the predefined machine learning module, so that the UE can track the current beam state in time, thereby greatly improving the timeliness of the current beam mismatch detection and the accuracy of the beam reselection, and ensuring that the UE can maintain a good link quality by continually tracking and switching to the beam which satisfy the communication needs regardless of the change of the environment and greatly reducing the impact of environment on UE beam selection.

Yet another embodiment provides an electronic device including: a processor and a memory, the memory is configured to store machine readable instructions that, when executed by the processor, cause the processor to perform the beam management method described above.

Figure 13:
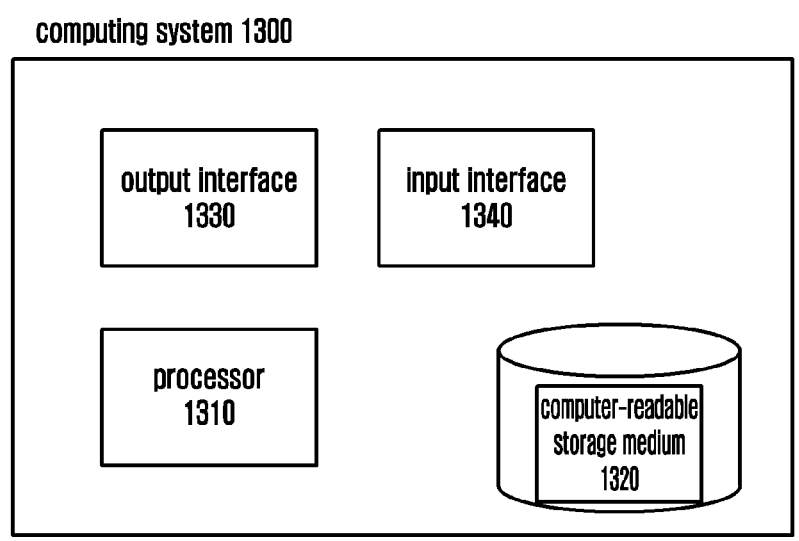
FIG. 13 is a schematic structural diagram of an electronic device according to an embodiment.

FIG. 13 schematically illustrates a block diagram of a computing system that can be used to implement a UE according to embodiments.

As shown in FIG. 13, the computing system 1300 includes a processor 1310, a computer readable storage medium 1320, an output interface 1330, and an input interface 1340. The computing system 1300 can perform the method described above with respect to FIG. 1 for beam processing.

Specifically, the processor 1310 can include, for example, a general-purpose microprocessor, an instruction set processor, and/or a related chipset and/or a special purpose microprocessor (e.g., an application specific integrated circuit (ASIC)), and the like. The processor 1310 may also include an onboard memory for caching purposes. The processor 1310 may be a single processing unit or may include multiple processing units for performing different actions of the method flows described above.

The computer readable storage medium 1320, for example, can be any medium that can contain, store, communicate, propagate or transport the instructions. The computer readable storage medium 1320 may be non-transitory. For example, a readable storage medium may include, but is not limited to, an electronic, magnetic, optical, electromagnetic, infrared, or semiconductor system, apparatus, device, or propagation medium. Specific examples of the readable storage medium include: a magnetic storage apparatus such as a magnetic tape or a hard disk (HDD); an optical storage apparatus such as a compact disk (CD-ROM); a memory such as a random-access memory (RAM) or a flash memory; and/or a wired/wireless communication link.

The computer readable storage medium 1320 can include a computer program, which can include code/computer executable instructions that, when executed by the processor 1310, cause the processor 1310 to perform, for example, the method flow described above in connection with FIG. 1 and any variations thereof.

The computer program can be configured to have, for example, computer program codes including a computer program module. For example, in an example embodiment, the codes in a computer program can include one or more program modules, including, for example, module 1, module 2, . . . . It should be noted that the division manner and number of modules are not fixed, and other suitable program modules or program module combinations may be used according to actual conditions. When these program module combinations are executed by the processor 1310, the program module combinations cause the processor 1310 to perform, for example, the method flows described above and any variations thereof.

According to an embodiment, the processor 1310 can use the output interface 1330 and the input interface 1340 to perform the method flows described above and any variations thereof.

It should be understood that although the various steps in the flowchart of the drawings are sequentially illustrated by the arrows, these steps are not necessarily performed in the order indicated by the arrows. Except as explicitly stated herein, the execution of these steps is not strictly limited, and may be performed in other orders. Moreover, at least some of the steps in the flowchart of the drawings may include multiple sub-steps or multiple stages, which are not necessarily performed at the same time, but may be executed at different times, and the execution order thereof is also not necessarily performed sequentially, but may be performed alternately or alternately with at least a portion of other steps or sub-steps or stages of other steps.

Although embodiments have been illustrated and described above, the disclosure is not limited to the specific embodiments described above, but may be variously modified by those skilled in the art to which the disclosure pertains without departing from the scope and spirit of the disclosure claimed in the claims. These modifications should also be understood to fall within the scope of the disclosure.

What is claimed is:

1. A method performed by a user equipment (UE), the method comprising:
   determining a receiving beam ratio of first receiving beams to a second receiving beam;
   receiving reference signals according to the receiving beam ratio corresponding to a transmitting beam by using at least one of the first receiving beams and the second receiving beam;
   identifying reference signal receiving power (RSRP) of the received reference signals;
   analyzing each RSRP by a machine learning model; and
   identifying a beam management operation corresponding to the transmitting beam according to a result of the analyzing,
   wherein the first receiving beam covers a first range, and the second receiving beam covers a second range that is wider than, and comprises, the first range of the first receiving beam, and
   wherein the receiving the reference signals comprises:
   measuring the reference signal a preset number of times alternately using the first receiving beam and the second receiving beam according to a preset beam ratio while monitoring a rotation speed of the UE,
   wherein the measuring of the reference signal changes the preset beam ratio and the preset number of times for measuring the reference signal based on the rotation speed of the UE.

2. The method according to claim 1, wherein the receiving the reference signals comprises:
   identifying the at least one first receiving beam and the second receiving beam based on a current beam pattern and a predefined selection rule;
   receiving multiple reference signals through the at least one first receiving beam and the second receiving beam; and
   identifying multiple RSRPs respectively corresponding to the multiple reference signals.

3. The method according to claim 1, wherein a correspondence between the first receiving beam and the second receiving beam changes as an antenna array configuration of the UE changes.

4. The method according to claim 1, wherein the first receiving beam comprises any one or any combination of an active beam and a predefined receiving beam of the UE.

5. The method according to claim 4, wherein the receiving the reference signals further comprises:
   identifying a receiving beam order of the first receiving beam and the second receiving beam;
   receiving the corresponding reference signal according to the receiving beam ratio and the receiving beam order by using the first receiving beam and the second receiving beam sequentially; and
   identifying the RSRP of the corresponding reference signal.

6. The method according to claim 1, wherein the result of the analyzing indicates any one or any combination of:
- a predicted value of a state of each receiving beam of the UE;
- an evaluation value of each receiving beam of the UE;
- a beam ranking corresponding to each receiving beam of the UE;
- a candidate set of optimal receiving beams;
- a long-term value when each receiving beam of the UE is an active beam;
- the beam to be measured;
- a measuring order; and
- a beamforming codebook to be used.

7. The method according to claim 1, wherein the method further comprises, before analyzing each RSRP by the machine learning model:
- arranging multiple RSRPs according to a predefined format, the multiple RSRPs comprising the first RSRP and the second RSRP; and
- performing data preprocessing on the multiple RSRPs, respectively.

8. The method according to claim 7, wherein the performing data preprocessing comprises any one or any combination of the following actions:
- increasing an offset; downscaling data of a first predefined ratio; upscaling data of a second predefined ratio; increasing an offset and downscaling data of the first predefined ratio; increasing an offset and upscaling data of the second predefined ratio.

9. The method according to claim 1, wherein the machine learning model comprises a reinforcement-learning-based Q learning model, and
wherein a Q function of the reinforcement-learning-based Q learning model comprises an artificial neural network model and hidden layers of the reinforcement-learning-based Q learning model comprise a bidirectional long short term memory network model.

10. The method according to claim 1, wherein a training method of the machine learning model comprises:
- obtaining a predefined amount of original data;
- processing the original data according to a predefined reinforcement learning method to obtain corresponding training data; and
- training the machine learning model based on the training data to obtain a trained machine learning model.

11. The method according to claim 1, further comprising:
- performing corresponding beam management based on the beam management operation; and
- refining corresponding parameters of the machine learning model based on a processing result of the beam management to further optimize the machine learning model.

12. The method according to claim 1, wherein the identifying the beam management operation corresponding to the transmitting beam comprises any one or any combination of the following operations:
- determining to switch the receiving beam;
- switching a current receiving beam to an identified receiving beam, the identified receiving beam being identified based on a beam state and/or an evaluation value;
- maintaining a current beam receiving configuration;
- identifying whether to switch the current beam receiving configuration;
- identifying a subsequent receiving beam for a subsequent measurement period based on the beam state and/or the evaluation value; and
- identifying whether to switch a receiving beam and to change a beamforming codebook.

13. The method according to claim 1, wherein the UE is operating in a carrier aggregation state where multiple carrier components are included, wherein the machine learning model comprises a corresponding machine learning model for each of the multiple carrier components,
wherein the receiving the reference signals comprises:
- for each carrier component, receiving the reference signals corresponding to the transmitting beam by using the at least one first receiving beam and the second receiving beam corresponding to a corresponding carrier component, respectively, and identifying a corresponding RSRP of each received beam, and
wherein the analyzing each RSRP respectively by the machine learning model, comprises:
- analyzing each RSRP respectively by the corresponding machine learning model.

14. The method according to claim 13, further comprising:
- identifying a beam pattern corresponding to each of the multiple carrier components based on a codebook of each of the multiple carrier components; and
- identifying at least two receiving beams respectively corresponding to each of the multiple carrier components based on a corresponding beam pattern and a predefined beam selection rule.

15. The method according to claim 1, wherein the UE measures multiple reference signals respectively transmitted on multiple transmitting beams,
wherein the receiving the reference signals comprises:
- for any of the multiple transmitting beams, receiving the reference signals transmitted by the multiple transmitting beams by using at least two receiving beams, respectively, and identifying an RSRP of each receiving beam,
wherein the analyzing each RSRP respectively by the machine learning model, comprises:
- for any one of the multiple transmitting beams, analyzing each RSRP by a corresponding machine learning model,
wherein the identifying the beam management operation corresponding to the multiple transmitting beams, comprises:
- for any of the multiple transmitting beams, identifying the beam management operation corresponding to the multiple transmitting beams, and
wherein, the method further comprises:
- performing a corresponding beam management according to the multiple transmitting beams based on transmission data being received from any of the multiple transmitting beams.

16. The method according to claim 15, further comprising:
- performing the corresponding beam management according to the beam management operation of the switched transmitting beam of the transmission data based on the transmission data being switched.

17. A user equipment (UE), the UE comprising:
a transceiver; and
at least one processor configured to:
- determine a receiving beam ratio of a first receiving beams to a second receiving beam;
- receive reference signals according to the receiving beam ratio corresponding to a transmitting beam by using at least one of the first receiving beams and the determined second receiving beam, determine reference signal receiving power (RSRP) of each receiving beam, analyze each RSRP by a machine learning model, and identify a beam management operation corresponding to the transmitting beam based on an output of the analysis result, wherein the first receiving beam covers a first range, and the second receiving beam covers a second range that is wider than, and comprises, the first range of the first receiving beam, and wherein the at least one processor:

receives the reference signals to measure the reference signal a predetermined number of times alternately using the first receiving beam and the second receiving beam according to a predetermined beam ratio while monitoring a rotation speed of the UE, wherein the measuring of the reference signal changes the predetermined beam ratio and the predetermined number of times for measuring the reference signal based on the rotation speed of the UE.

18. The method according to claim 1, further comprising identifying a receiving beam order based on whether the rotation speed exceeds the threshold, wherein the receiving the reference signals is performed according to the receiving beam order.

19. The method according to claim 1, wherein the at least one first receiving beam and the second receiving beam further comprises a third receiving beam covering a third range, and wherein the second range of the second receiving beam comprises the first range of the first receiving beam and the third range of the third receiving beam.

20. A method performed by a user equipment (UE), the method comprising:

receiving reference signals corresponding to a transmitting beam by using at least two receiving beams;

identifying reference signal receiving power (RSRP) of each receiving beam;

analyzing each RSRP by a machine learning model; and identifying a beam management operation corresponding to the transmitting beam according to a result of the analyzing, wherein the at least two receiving beams comprise a first receiving beam covering a first range, and a second receiving beam covering a second range comprising the first range the first receiving beam, wherein the first receiving beam comprises any one or any combination of an active beam and a predefined receiving beam of the UE, wherein the receiving the reference signals comprises:

measuring the reference signal N1 times alternately using the first receiving beam and the second receiving beam, wherein the first receiving beam is the active beam;

monitoring a rotation speed of the UE;

based on the UE detecting that the rotation speed exceeds a threshold, measuring the reference signal N2 times alternately using the first receiving beam and the second receiving beam, wherein the first receiving beam comprises multiple predefined receiving beams;

identifying whether a signal of the UE is occluded; and based on the UE detecting that the signal is occluded, measuring the reference signal N3 times alternately using the first receiving beam and a corresponding second receiving beam, wherein a measuring ratio of the first receiving beam and the second receiving beam is a predefined ratio, and the first receiving beam comprises the multiple predefined receiving beams and active beams, and wherein N1, N2, and N3 are all positive integers.

\* \* \* \* \*